(12) United States Patent
Yeo et al.

(10) Patent No.: US 12,506,571 B2
(45) Date of Patent: Dec. 23, 2025

(54) METHOD AND DEVICE FOR TRANSMITTING AND RECEIVING CONTROL INFORMATION AND DATA IN WIRELESS COMMUNICATION SYSTEM

(71) Applicant: Samsung Electronics Co., Ltd., Suwon-si (KR)

(72) Inventors: Jeongho Yeo, Suwon-si (KR); Cheolkyu Shin, Suwon-si (KR); Hyunseok Ryu, Suwon-si (KR); Jaeeun Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 435 days.

(21) Appl. No.: 17/768,836

(22) PCT Filed: Oct. 19, 2020

(86) PCT No.: PCT/KR2020/014233
§ 371 (c)(1),
(2) Date: Apr. 13, 2022

(87) PCT Pub. No.: WO2021/075933
PCT Pub. Date: Apr. 22, 2021

(65) Prior Publication Data
US 2023/0058037 A1    Feb. 23, 2023

(30) Foreign Application Priority Data
Oct. 17, 2019    (KR) .................. 10-2019-0128992

(51) Int. Cl.
*H04L 5/00*    (2006.01)
*H04L 1/1812*    (2023.01)
*H04W 72/0453*    (2023.01)

(52) U.S. Cl.
CPC .......... *H04L 5/0044* (2013.01); *H04L 1/1812* (2013.01); *H04W 72/0453* (2013.01)

(58) Field of Classification Search
CPC ... H04L 5/0044; H04L 1/1812; H04L 1/1887; H04L 1/1893; H04L 1/1896;
(Continued)

(56) References Cited

U.S. PATENT DOCUMENTS 10,432,362 B2    10/2019    Iyer et al.
11,337,188 B2 *    5/2022    Oh ..................... H04W 4/70
(Continued)

FOREIGN PATENT DOCUMENTS

CN          110290592 B  *  4/2024    ............ H04L 5/001
KR    10-2018-0135479 A    12/2018
(Continued)

OTHER PUBLICATIONS

International Search Report and Written Opinion of the International Searching Authority dated Jan. 25, 2021, in connection with International Application No. PCT/KR2020/014233, 10 pages.
(Continued)

*Primary Examiner* — Mounir Moutaouakil

(57) ABSTRACT

The present disclosure relates to: a communication technique combining IoT, V2X, or sidelink technology with a 5G communication system supporting higher data transmission rates than 4G systems; and a system therefor. The present disclosure may be applied to intelligent services (for example, smart homes, smart buildings, smart cities, smart cars or connected cars, healthcare, digital education, retail, security and safety-related services, and the like) on the basis of 5G communication technology and IoT, V2X or sidelink-related technologies. Furthermore, the present dis-
(Continued)

closure relates to a method and device for transmitting and receiving control information and data in a wireless communication system.

12 Claims, 26 Drawing Sheets

(58) Field of Classification Search
CPC ... H04L 5/0051; H04L 5/0055; H04L 1/1819; H04L 5/0053; H04W 72/0453; H04W 72/1263; H04W 92/18; H04W 72/20; H04B 7/0695
See application file for complete search history.

(56) References Cited

U.S. PATENT DOCUMENTS

| | | | | |
|---|---|---|---|---|
| 11,528,091 | B2* | 12/2022 | Lee | H04L 1/0011 |
| 11,902,214 | B2* | 2/2024 | Park | H04L 5/0016 |
| 2019/0104525 | A1 | 4/2019 | Santhanam et al. | |
| 2019/0149273 | A1* | 5/2019 | Golitschek Edler von Elbwart | H04L 1/1864 714/748 |
| 2019/0182827 | A1 | 6/2019 | Wang et al. | |
| 2019/0222364 | A1* | 7/2019 | Shimoda | H04W 80/02 |
| 2019/0246424 | A1* | 8/2019 | Zhang | H04L 1/1671 |
| 2019/0260514 | A1* | 8/2019 | Schaich | H04L 1/08 |
| 2020/0106566 | A1* | 4/2020 | Yeo | H04L 1/1854 |
| 2020/0351057 | A1* | 11/2020 | Yeo | H04L 1/1854 |
| 2020/0351856 | A1* | 11/2020 | Yeo | H04L 1/0023 |
| 2021/0007081 | A1* | 1/2021 | Shin | H04L 1/1896 |
| 2022/0046564 | A1* | 2/2022 | Shimoda | H04L 1/1851 |
| 2022/0183002 | A1* | 6/2022 | Yeo | H04L 1/1854 |
| 2022/0209905 | A1* | 6/2022 | Han | H04L 1/1887 |
| 2022/0303952 | A1* | 9/2022 | Hoang | H04L 5/0005 |
| 2022/0330261 | A1* | 10/2022 | Yeo | H04W 72/543 |

FOREIGN PATENT DOCUMENTS

| | | | |
|---|---|---|---|
| KR | 10-2021-0041429 A | 4/2021 | |
| WO | WO-2021030561 A1 * | 2/2021 | H04L 1/1812 |

OTHER PUBLICATIONS

Intel Corporation, "Sidelink physical structure for NR V2X communication," R1-1910648, 3GPP TSG RAN WG1 Meeting #98bis, Chongqing, China, Oct. 14-20, 2019, 29 pages.

Zte, et al., "Mode 2 resource allocation schemes on sidelink," R1-1910279, 3GPP TSG RAN WG1 #98bis, Chongqing, China, Oct. 14-20, 2019, 8 pages.

Office Action dated Mar. 26, 2025, in connection with Korean application No. 10-2019-0128992, 6 pages.

* cited by examiner

METHOD AND DEVICE FOR TRANSMITTING AND RECEIVING CONTROL INFORMATION AND DATA IN WIRELESS COMMUNICATION SYSTEM

CROSS-REFERENCE TO RELATED APPLICATIONS

This application is a 371 National Stage of International Application No. PCT/KR2020/014233, filed Oct. 19, 2020, which claims priority to Korean Patent Application No. 10-2019-0128992, filed Oct. 17, 2019, the disclosures of which are herein incorporated by reference in their entirety.

BACKGROUND

1. Field

The disclosure generally relates to a wireless communication system, and more particularly, to an apparatus and method for transmitting and receiving control information and data of a terminal in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'.

The 5G communication system established by the 3rd generation partnership project (3GPP) is called a new radio (NR) system. The 5G communication system is considered to be implemented in extremely high frequency (mmWave) bands, e.g., 60 or 70 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques have been discussed and adopted in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

As a wireless communication system has developed, such as a 5G system, it is expected to be able to provide various services. Therefore, there is a need for ways to smoothly provide such services.

SUMMARY

The disclosure provides a method and apparatus for transmitting and receiving control information in a wireless communication system.

The disclosure provides a method and apparatus for a terminal to decode first control information and decode second control information based thereon in applying a method for transmitting control information in two steps in a sidelink.

In addition, the disclosure provides a method and apparatus for calculating the size of a bit field for mapping resource allocation information in control information and interpreting the bit-field.

A method of a first terminal in a wireless communication system according to an embodiment of the disclosure for solving the above-described technical problem may include identifying a size of a frequency resource related to initial transmission and a size of a frequency resource related to at least one retransmission; identifying a size of a transport block based on at least one of the size of the frequency resource related to the initial transmission and the size of the frequency resource related to the at least one retransmission; and transmitting a transport block according to the size of the transport block to a second terminal through the initial transmission or the at least one retransmission, wherein the size of the frequency resource related to the initial transmission and the size of the frequency resource related to the at least one retransmission may be different from each other. According to an embodiment, a redundancy version (RV) related to the initial transmission may be identical with an RV related to first retransmission among the at least one retransmission.

According to an embodiment, the method may further include identifying a maximum number of transmissions related to the transport block, wherein for the at least one retransmission excluding the initial transmission, retransmissions may be allowed as many as the maximum number of transmissions.

According to an embodiment, for the transport block transmitted through the initial transmission, decoding by the second terminal may not be performed.

According to an embodiment, a hybrid automatic repeat request (HARQ) ACK signal corresponding to the transport block transmitted through the initial transmission may not be transmitted by the second terminal.

In addition, a method of a second terminal in a wireless communication system according to an embodiment of the disclosure may include receiving a transport block from a first terminal through initial transmission or at least one retransmission; identifying a size of a frequency resource related to the initial transmission and a size of a frequency resource related to the at least one retransmission; and identifying a size of the transport block based on at least one of the size of the frequency resource related to the initial transmission and the size of the frequency resource related to the at least one retransmission, wherein the size of the frequency resource related to the initial transmission and the size of the frequency resource related to the at least one retransmission may be different from each other.

A first terminal in a wireless communication system according to an embodiment of the disclosure may include a transceiver; and a controller configured to identify a size of a frequency resource related to initial transmission and a size of a frequency resource related to at least one retransmission, to identify a size of a transport block based on at least one of the size of the frequency resource related to the initial transmission and the size of the frequency resource related to the at least one retransmission, and to transmit a transport block according to the size of the transport block to a second terminal through the initial transmission or the at least one retransmission, wherein the size of the frequency resource related to the initial transmission and the size of the frequency resource related to the at least one retransmission may be different from each other.

A second terminal in a wireless communication system according to an embodiment of the disclosure may include a transceiver; and a controller configured to receive a transport block from a first terminal through initial transmission or at least one retransmission, to identify a size of a frequency resource related to the initial transmission and a size of a frequency resource related to the at least one retransmission, and to identify a size of the transport block based on at least one of the size of the frequency resource related to the initial transmission and the size of the frequency resource related to the at least one retransmission, wherein the size of the frequency resource related to the initial transmission and the size of the frequency resource related to the at least one retransmission may be different from each other.

According to various embodiments of the disclosure, it is possible to efficiently manage a soft buffer of a terminal when performing communication between terminals and to enable communication between terminals by allowing transmitting and receiving terminals to have a common understanding with each other.

The effects obtainable in the disclosure are not limited to the above-mentioned effects, and those of ordinary skill in the art to which the disclosure pertains will clearly understand, from the following description, other effects not mentioned herein.

DETAILED DESCRIPTION

Figure 1:
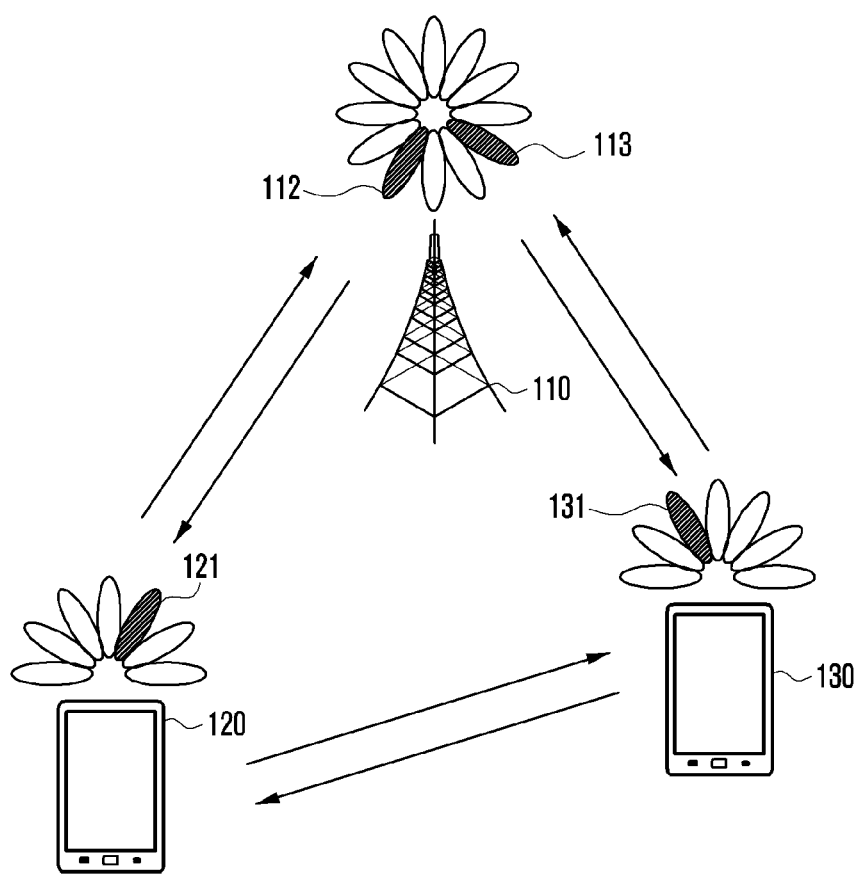
FIG. 1 is a diagram illustrating a wireless communication system according to various embodiments of the disclosure.

Hereinafter, embodiments of the disclosure will be described in detail with reference to the accompanying drawings. In describing embodiments, descriptions of technical contents that are well known in the technical field to which the disclosure pertains and are not directly related to the disclosure will be omitted. This is to more clearly convey the subject matter of the disclosure without obscuring it by omitting unnecessary description.

For the same reason, some elements are exaggerated, omitted, or schematically illustrated in the accompanying drawings. In addition, the depicted size of each element does not fully reflect the actual size. In the drawings, the same or corresponding elements are assigned the same reference numerals.

The advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims. Throughout the specification, the same reference numerals refer to the same constitutional elements.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors. Therefore, a "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card.

In the following description, terms that refer to signals, terms that refer to channels, terms that refer to control information, terms that refer to network entities, and terms that refer to components of devices are for convenience of description. Therefore, the disclosure is not limited to such terms, which may be replaced with other terms referring to objects having equivalent technical meanings.

In the disclosure, a physical channel and a signal may be used interchangeably with data or a control signal. For example, a physical downlink shared channel (PDSCH) is a term that refers to a physical channel through which data is transmitted, but the PDSCH may also be used to refer to data. That is, in the disclosure, an expression "transmitting a physical channel" may be interpreted equivalently to an expression "transmitting data or a signal through a physical channel".

In the disclosure, higher signaling refers to a method of transmitting a signal from a base station to a user equipment through a downlink data channel of a physical layer, or from a user equipment to a base station through an uplink data channel of a physical layer. The higher signaling may be understood as radio resource control (RRC) signaling or media access control (MAC) control element (CE).

In the disclosure, an expression of 'greater than' or 'smaller than' is used so as to determine whether a specific condition is satisfied or fulfilled, but this is exemplary only and does not exclude an expression of 'equal to or greater than' or 'equal to or smaller than'. That is, a condition expressed as 'greater than' may be replaced with a condition expressed as 'equal to or greater than', a condition expressed as 'smaller than' may be replaced with a condition expressed as 'equal to or smaller than', and vice versa.

In the disclosure, although embodiments are described using terms defined in some communication standards (e.g., 3GPP), this is exemplary only for description. The embodiments of the disclosure may also be applied to other communication systems through simple modification. In particular, the disclosure is applicable to 3GPP NR (5th generation mobile communication standard). In addition, the disclosure may be applied to intelligent services (e.g., smart home, smart building, smart city, smart car or connected car, health care, digital education, retail business, security and safety-related services, etc.) based on 5G communication technology and IoT-related technology.

Hereinafter, the disclosure relates to an apparatus and method for managing a soft buffer in a wireless communication system. Specifically, the disclosure describes a technique in which, when a signal transmitted after channel coding in a wireless communication system arrives at a receiver, the receiver determines a soft buffer for storing a received signal or a modified received signal, and a transmitting terminal determines parity bits to be transmitted based on determining the soft buffer.

FIG. 1 is a diagram illustrating a wireless communication system according to various embodiments of the disclosure.

FIG. 1 exemplarily shows a base station 110, a UE 120, and a UE 130 as some of nodes using a wireless channel in a wireless communication system. Although FIG. 1 shows only one base station, other base stations that are identical with or similar to the base station 110 may be further included.

The base station 110 is a network infrastructure that provides a radio access to the UEs 120 and 130. The base station 110 has the coverage defined as a certain geographic area based on a signal transmittable distance. The base station 110 may be referred to as 'access point (AP)', 'eNodeB (eNB)', '5th generation (5G) node', 'next generation nodeB (gNB)', 'wireless point', 'transmission/reception point (TRP)', or any other term having an equivalent technical meaning.

Each of the UEs 120 and 130 is a device used by a user and may perform communication with the base station 110 through a wireless channel. A link from the base station 110 to the UE 120 or the UE 130 may be referred to as a downlink (DL), and a link from the UE 120 or the UE 130 to the base station 110 may be referred to as an uplink (UL). In addition, the UEs 120 and 130 may perform communication therebetween through a wireless channel. In this case, a device-to-device link (D2D) between the UEs 120 and 130 is referred to as a sidelink, and the sidelink may be interchangeably used with a PC5 interface. In some cases, at least one of the UEs 120 and 130 may be operated without the user's involvement. That is, at least one of the UEs 120 and 130 is a device that performs machine type communication (MTC) and may not be carried by the user. Each of the UEs 120 and 130 may be referred to as 'user equipment (UE)', 'terminal', 'mobile station', 'subscriber station', 'remote terminal', 'wireless terminal', 'user device', or any other term having an equivalent technical meaning.

The base station 110, the UE 120, and the UE 130 may transmit and receive radio signals in a millimeter wave (mmWave) band (e.g., 28 GHz, 30 GHz, 38 GHZ, or 60 GHz). In this case, the base station 110, the UE 120, and the UE 130 may perform beamforming in order to improve the channel gain. The beamforming may include transmit beamforming and receive beamforming. That is, the base station 110, the UE 120, and the UE 130 may impart directivity to a transmission signal or a reception signal. To this end, the base station 110 and the UEs 120 and 130 may select serving beams 112, 113, 121, and 131 through a beam search or beam management procedure. After the serving beams 112, 113, 121, and 131 are selected, subsequent communication may be performed through a resource having a quasi co-located (QCL) relationship with a resource transmitting the serving beams 112, 113, 121, and 131.

If large-scale characteristics of a channel carrying a symbol on a first antenna port can be inferred from a channel carrying a symbol on a second antenna port, the first antenna port and the second antenna port can be evaluated to be in a QCL relationship. The large-scale characteristics may include, for example, at least one of a delay spread, a Doppler spread, a Doppler shift, an average gain, an average delay, and a spatial receiver parameter.

Figure 2:
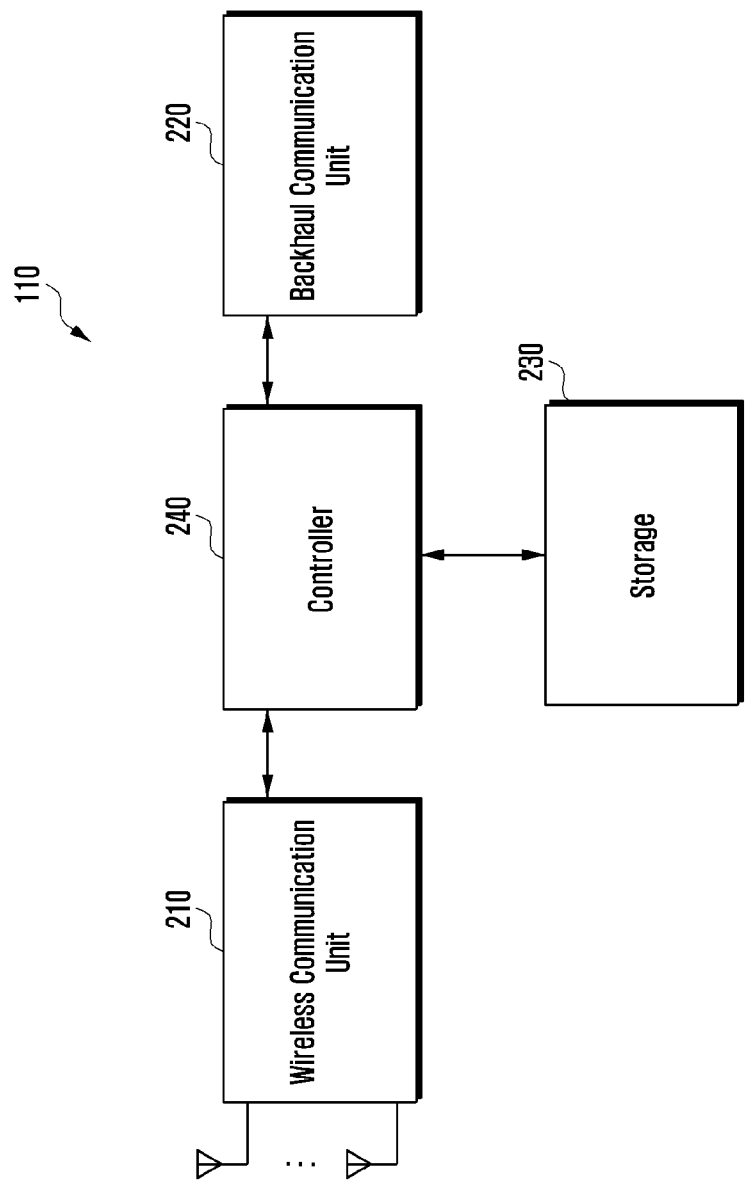
FIG. 2 is a diagram illustrating the constitution of a base station in a wireless communication system according to various embodiments of the disclosure.

FIG. 2 is a diagram illustrating the constitution of a base station in a wireless communication system according to various embodiments of the disclosure.

Shown in FIG. 2 may be understood as the constitution of the base station 110. The term 'unit' used herein refers to a unit that processes at least one function or operation, which may be implemented with hardware, software, or a combination thereof.

With reference to FIG. 2, the base station 110 may include a wireless communication unit 210, a backhaul communication unit 220, a storage 230, and a controller 240.

The wireless communication unit 210 may perform functions for transmitting and receiving a signal through a wireless channel. For example, the wireless communication unit 210 may perform a conversion function between a baseband signal and a bit stream in accordance with a physical layer standard of the system. When transmitting data, the wireless communication unit 210 may generate complex symbols by encoding and modulating a bit stream to be transmitted. Also, when receiving data, the wireless communication unit 210 may restore received bit stream by demodulating and decoding a baseband signal.

In addition, the wireless communication unit 210 up-converts a baseband signal into a radio frequency (RF) band signal, transmits it through an antenna, and down-converts an RF band signal received through an antenna into a baseband signal. To this end, the wireless communication unit 210 may include a transmission filter, a reception filter, an amplifier, a mixer, an oscillator, a digital-to-analog converter (DAC), an analog-to-digital converter (ADC), and the like. Also, the wireless communication unit 210 may include a plurality of transmission/reception paths. Further, the wireless communication unit 210 may include at least one antenna array composed of a plurality of antenna elements.

In terms of hardware, the wireless communication unit 210 may be composed of a digital unit and an analog unit. The analog unit may be composed of a plurality of sub-units depending on operating power, operating frequency, etc., and the digital unit may be implemented by at least one processor (e.g., a digital signal processor (DSP)).

The wireless communication unit 210 transmits and receives a signal as mentioned above. Accordingly, all or part of the wireless communication unit 210 may be referred to as a 'transmitter', a 'receiver', or a 'transceiver'. In the following description, transmission and reception performed through a wireless channel are used in the meaning of including the above-described processing performed by the wireless communication unit 210.

The backhaul communication unit 220 may provide an interface for performing communication with other nodes in the network. That is, the backhaul communication unit 220 may convert a bit string, to be transmitted from the base station 110 to other node, for example, other access node, other base station, an upper node, a core network, etc., into a physical signal, and may also convert a physical signal received from other node into a bit string.

The storage 230 may store a default program for the operation of the base station 110, an application program, and data such as setting information. The storage 230 may be composed of a volatile memory, a non-volatile memory, or a combination thereof. The storage 230 may provide stored data in response to a request of the controller 240.

The controller 240 may control overall operations of the base station 110. For example, the controller 240 may transmit and receive a signal through the wireless communication unit 210 or through the backhaul communication unit 220. In addition, the controller 240 writes and reads data in the storage 230. Also, the controller 240 may perform functions of a protocol stack required by the communication standard. In another implementation example, the protocol stack may be included in the wireless communication unit 210. The controller 240 may include at least one processor. According to embodiments, the controller 240 may control the base station to perform operations of the embodiments to be described later.

Figure 3:
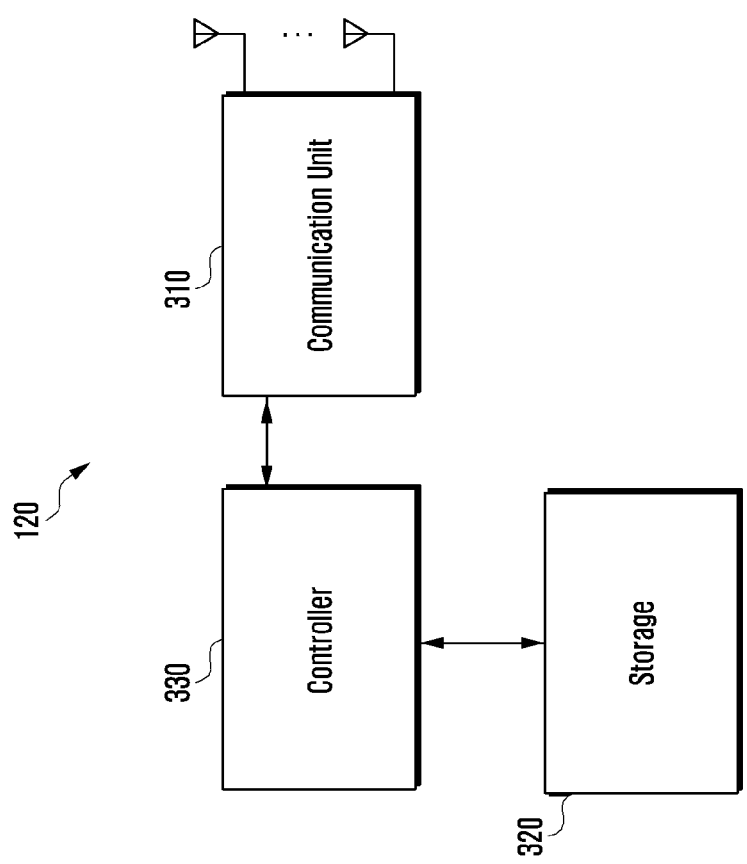
FIG. 3 is a diagram illustrating the constitution of a user equipment (UE) in a wireless communication system according to various embodiments of the disclosure.

FIG. 3 is a diagram illustrating the constitution of a user equipment (UE) in a wireless communication system according to various embodiments of the disclosure.

Shown in FIG. 3 may be understood as the constitution of the UE 120. The term 'unit' used herein refers to a unit that processes at least one function or operation, which may be implemented with hardware, software, or a combination thereof.

With reference to FIG. 3, the UE may include a wireless communication unit 310, a storage 320, and a controller 330.

The wireless communication unit 310 may perform functions for transmitting and receiving a signal through a wireless channel. For example, the wireless communication unit 310 may perform a conversion function between a baseband signal and a bit stream in accordance with a physical layer standard of the system. When transmitting data, the wireless communication unit 310 may generate complex symbols by encoding and modulating a bit stream to be transmitted. Also, when receiving data, the wireless communication unit 310 may restore received bit stream by demodulating and decoding a baseband signal. In addition, the wireless communication unit 310 up-converts a baseband signal into an RF band signal, transmits it through an antenna, and down-converts an RF band signal received through an antenna into a baseband signal. For example, the wireless communication unit 310 may include a transmission filter, a reception filter, an amplifier, a mixer, an oscillator, a DAC, an ADC, and the like.

Also, the wireless communication unit 310 may include a plurality of transmission/reception paths. Furthermore, the wireless communication unit 310 may include at least one antenna array composed of a plurality of antenna elements. In terms of hardware, the wireless communication unit 310 may be composed of a digital unit and an analog unit (e.g., a radio frequency integrated circuit (RFIC)). The digital circuit and the analog circuit may be implemented in one package. In addition, the communication unit 310 may include a plurality of RF chains. Furthermore, the communication unit 310 may perform beamforming.

The wireless communication unit 310 transmits and receives a signal as mentioned above. Accordingly, all or part of the wireless communication unit 310 may be referred to as a 'transmitter', a 'receiver', or a 'transceiver'. In the following description, transmission and reception performed through a wireless channel are used in the meaning of including the above-described processing performed by the wireless communication unit 310.

The storage 320 may store a default program for the operation of the UE, an application program, and data such as setting information. The storage 320 may be composed of a volatile memory, a non-volatile memory, or a combination thereof. The storage 320 may provide stored data in response to a request of the controller 330.

The controller 330 may control overall operations of the UE. For example, the controller 330 may transmit and receive a signal through the wireless communication unit 310. In addition, the controller 330 writes and reads data in the storage 320. Also, the controller 330 may perform functions of a protocol stack required by the communication standard. To this end, the controller 330 may include at least one processor or microprocessor, or may be a part of the processor. Also, a part of the communication unit 310 and the controller 330 may be referred to as a communication processor (CP). According to embodiments, the controller 330 may control the UE to perform operations of the embodiments to be described later.

Figure 4:
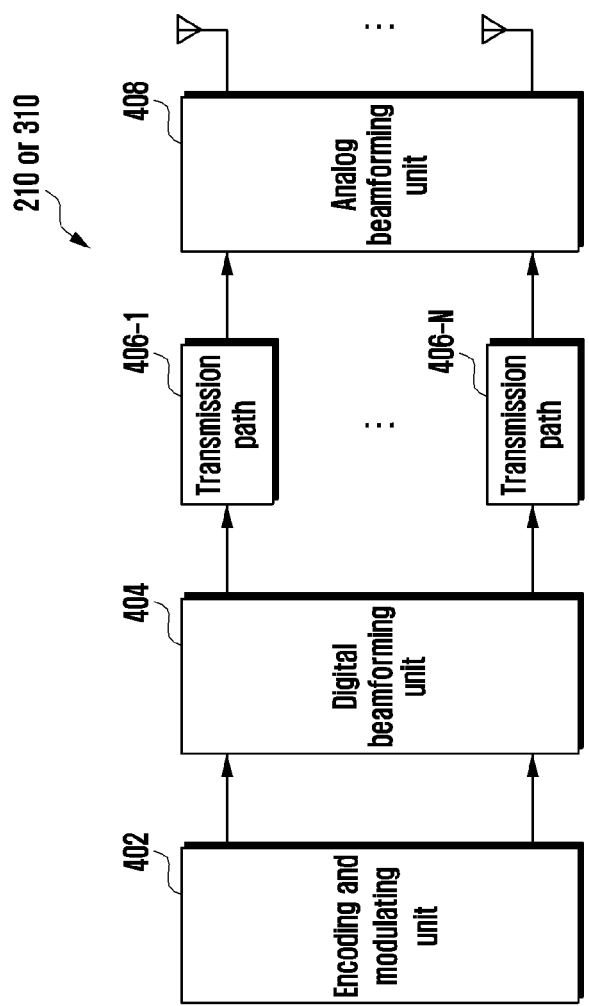
FIG. 4 is a diagram illustrating the constitution of a communication unit in a wireless communication system according to various embodiments of the disclosure.

FIG. 4 is a diagram illustrating the constitution of a communication unit in a wireless communication system according to various embodiments of the disclosure.

FIG. 4 shows an example of a detailed constitution of the wireless communication unit 210 shown in FIG. 2 or the communication unit 310 shown in FIG. 3. Specifically, FIG. 4 shows components for performing beamforming as a part of the wireless communication unit 210 of FIG. 2 or the communication unit 310 of FIG. 3.

With reference to FIG. 4, the wireless communication unit 210 or the communication unit 310 may include an encoding and modulating unit 402, a digital beamforming unit 404, a plurality of transmission paths 406-1 to 406-N, and an analog beamforming unit 408.

The encoding and modulating unit 402 may perform channel encoding. For channel encoding, at least one of a low density parity check (LDPC) code, a convolution code, and a polar code may be used. The encoding and modulating unit 402 generates modulation symbols by performing constellation mapping.

The digital beamforming unit 404 performs beamforming for a digital signal (e.g., modulation symbols). To this end, the digital beamforming unit 404 multiplies the modulation symbols by beamforming weights. Here, the beamforming weights are used to change the magnitude and phase of a signal, and may be referred to as a 'precoding matrix', a 'precoder', or the like. The digital beamforming unit 404 may output digital-beamformed modulation symbols to the plurality of transmission paths 406-1 to 406-N. In this case, based on a multiple input multiple output (MIMO) transmission technique, the modulation symbols may be multiplexed, or the same modulation symbols may be provided to the plurality of transmission paths 406-1 to 406-N.

The plurality of transmission paths 406-1 to 406-N convert digital-beamformed digital signals into analog signals. To this end, each of the plurality of transmission paths 406-1 to 406-N may include an inverse fast Fourier transform (IFFT) calculator, a cyclic prefix (CP) inserter, a DAC, and an up-converter. The CP inserter is suitable for an orthogonal frequency division multiplexing (OFDM) scheme, and may be excluded when any other physical layer scheme (e.g., a filter bank multi-carrier (FBMC)) is applied. That is, the plurality of transmission paths 406-1 to 406-N provide an independent signal processing process for a plurality of streams generated through digital beamforming. However, depending on the implementation type, some of the components of the plurality of transmission paths 406-1 to 406-N may be used in common.

The analog beamforming unit 408 performs beamforming for an analog signal. To this end, the analog beamforming unit 408 multiplies the analog signals by beamforming weights. Here, the beamforming weights are used to change the magnitude and phase of a signal. Specifically, the analog beamforming unit 408 may be variously configured depending on a connection structure between the plurality of transmission paths 406-1 to 406-N and the antennas. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array or connected to two or more antenna arrays.

Outgrowing what provides an initial voice-oriented service, a wireless communication system is evolving to a broadband wireless communication system that provides a high-speed and high-quality packet data service, like communication standards such as, for example, 3GPP high speed packet access (HSPA), long term evolution (LTE) (or evolved universal terrestrial radio access (E-UTRA)), LTE-advanced (LTE-A), high rate packet data (HRPD) of 3GPP2, ultra-mobile broadband (UMB), and 802.16e of IEEE. In addition, a 5G or new radio (NR) communication standard is being made as a 5G wireless communication system.

The NR system employs an orthogonal frequency division multiplexing (OFDM) scheme in a downlink (DL) and an uplink (UL). Specifically, a cyclic-prefix OFDM (CP-OFDM) scheme is employed in the downlink, and a discrete Fourier transform spreading OFDM (DFT-S-OFDM) scheme is employed together with the CP-OFDM in the uplink. The uplink refers to a radio link in which the UE transmits data or control signals to the base station, and the downlink refers to a radio link in which the base station transmits data or control signals to the UE. This multiple access scheme generally allocates and operates time-frequency resources for carrying data or control information to be not overlapped for each user (that is, orthogonality is established), so that each user's data or control information can be distinguished.

The NR system employs a hybrid automatic repeat request (HARQ) scheme for retransmitting corresponding data in a physical layer when a decoding failure occurs in the initial transmission. In the HARQ scheme, when failing to correctly decode data, a receiver sends information (negative acknowledgment; NACK) indicating a decoding failure to a transmitter so that the transmitter can retransmit the data in the physical layer. The receiver may improve data reception performance by combining data retransmitted by the transmitter with data that has previously failed to be decoded. In addition, when correctly decoding data, the receiver sends information (acknowledgement; ACK) indicating a decoding success to the transmitter so that the transmitter can transmit new data.

Figure 5:
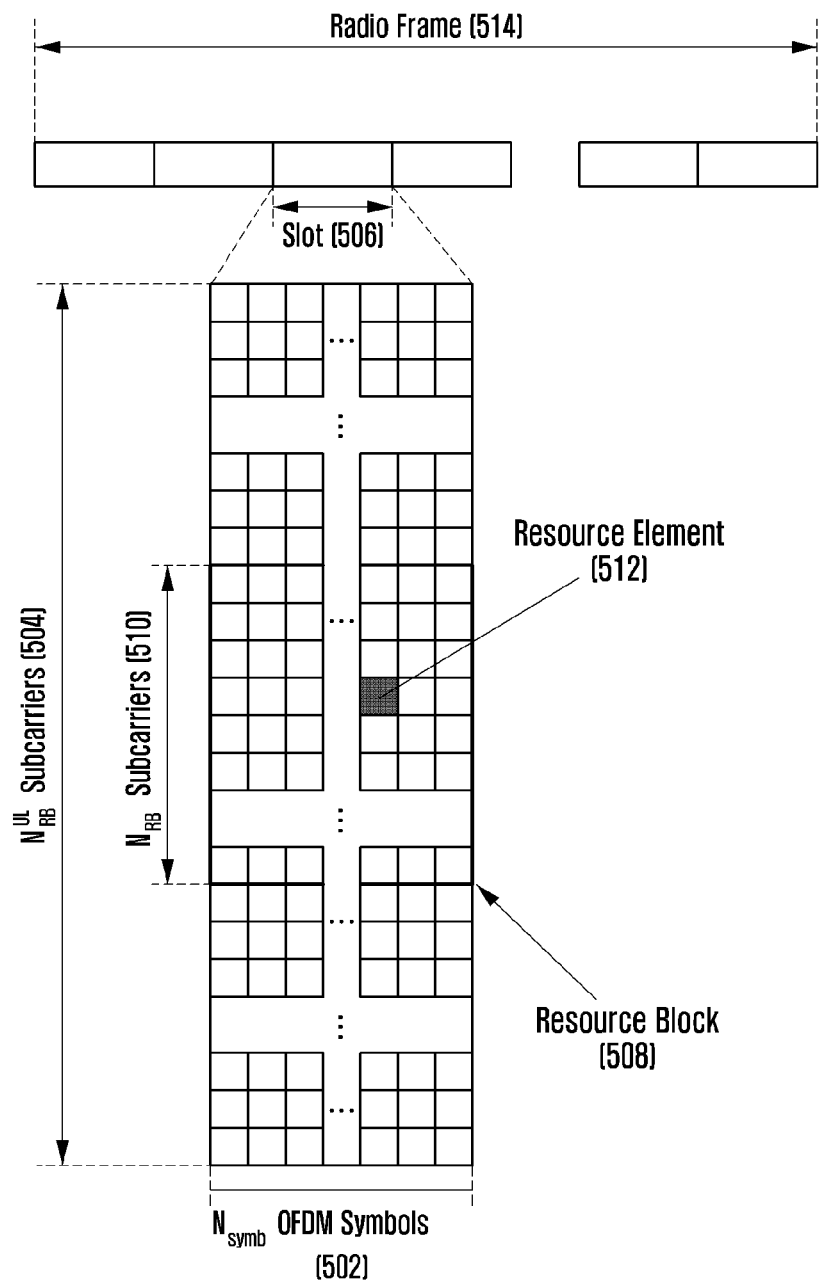
FIG. 5 is a diagram illustrating a resource structure of a time-frequency domain of a wireless communication system according to various embodiments of the disclosure.

FIG. 5 is a diagram illustrating a resource structure of a time-frequency domain of a wireless communication system according to various embodiments of the disclosure.

FIG. 5 shows a basic structure of the time-frequency domain which is a radio resource domain in which data or a control channel is transmitted in downlink or uplink.

In FIG. 5, the horizontal axis represents the time domain and the vertical axis represents the frequency domain. The minimum transmission unit in the time domain is an OFDM symbol, and Nsymb OFDM symbols 502 constitute one slot 506. The length of a subframe is defined as 1.0 ms, and the length of a radio frame 514 is defined as 10 ms. The minimum transmission unit in the frequency domain is a subcarrier, and the bandwidth of the entire system transmission band is composed of NBW subcarriers 504 in total. Specific values such as Nsymb and NBW may be variably applied depending on the system.

A basic unit of a resource in the time-frequency domain is a resource element (RE) 512, which may be represented with an OFDM symbol index and a subcarrier index. A resource block (RB) 508 or physical resource block (PRB) is defined as consecutive Nsymb OFDM symbols 502 in the time domain and consecutive NRB subcarriers 510 in the frequency domain. Therefore, one RB 508 includes Nsymb×NRB number of REs 512. In general, the minimum transmission unit of data is the RB. Generally, in the NR system, Nsymb is 14, NRB is 12, and NBW and NRB are proportional to the bandwidth of the system transmission band. Also, a data rate may increase in proportion to the number of RBs scheduled for a UE. In the NR system, in case of a frequency division duplex (FDD) system that divides downlink and uplink by frequency, a downlink transmission bandwidth and an uplink transmission bandwidth may be different from each other. A channel bandwidth represents a radio frequency (RF) bandwidth corresponding to the system transmission bandwidth. Table 1 and Table 2 show a part of the corresponding relationship among system transmission bandwidth, subcarrier spacing (SCS), and channel bandwidth defined in the NR system in a frequency band lower than 6 GHz and a frequency band higher than 6 GHz, respectively. For example, the NR system having a channel bandwidth of 100 MHz with a subcarrier spacing of 30 kHz has a transmission bandwidth of 273 RBs. In the following, N/A may be a bandwidth-subcarrier combination not supported by the NR system.

TABLE 1

| Channel bandwidth [MHz] | SCS | 5 | 10 | 20 | 50 | 80 | 100 |
|---|---|---|---|---|---|---|---|
| Transmission bandwidth configuration $N_{RB}$ | 15 kHz | 25 | 52 | 106 | 270 | N/A | N/A |
| | 30 kHz | 11 | 24 | 51 | 133 | 217 | 273 |
| | 60 kHz | N/A | 11 | 24 | 65 | 107 | 135 |

TABLE 2

| Channel bandwidth [MHz] | SCS | 50 | 100 | 200 | 400 |
|---|---|---|---|---|---|
| Transmission configuration bandwidth $N_{RB}$ | 60 kHz | 66 | 132 | 264 | N/A |
| | 120 kHz | 32 | 66 | 132 | 264 |

In the NR system, scheduling information for downlink data or uplink data is transmitted from a base station to a UE through downlink control information (DCI). The DCI may be defined in various formats, and based on each format, the DCI may indicate whether it is scheduling information (UL grant) for uplink data or scheduling information (DL grant) for downlink data, whether it is a compact DCI with a small size of control information, whether spatial multiplexing using multiple antennas is applied, whether it is DCI for power control, and the like. For example, DCI format 1-1, which is scheduling control information (DL grant) for downlink data, may include at least one of items shown in Table 3 below.

TABLE 3

| Item | Contents |
|---|---|
| Carrier indicator | This indicates a frequency carrier where transmission is performed. |
| DCI format indicator | This is an indicator for distinguishing whether the corresponding DCI is for downlink or uplink. |
| BWP (bandwidth part) indicator | This indicates a BWP where transmission is performed. |
| Frequency domain resource allocation | This indicates an RB in the frequency domain allocated for data transmission. A resource to be expressed is determined according to the system bandwidth and the resource allocation scheme. |
| Time domain resource allocation | This indicates an OFDM symbol and a slot to be used for transmission of a data-related channel. |
| VRB-to-PRB mapping | This indicates a mapping scheme between a virtual RB (VRB) index and a physical RB (PRB) index. |
| MCS (modulation and coding scheme) | This indicates a modulation scheme and coding rate used for data transmission. That is, together with information on whether it is QPSK, 16QAM, 64QAM, or 256QAM, a coding rate value informing channel coding information and a TBS may be indicated. |
| Codeblock group (CBG) transmission information | When CBG retransmission is configured, this indicates information on which CBG is transmitted. |
| HARQ process number | This indicates the process number of HARQ. |
| NDI (new data indicator) | This indicates whether HARQ initial transmission or retransmission. |
| RV (redundancy version) | This indicates a redundant version of HARQ. |
| Transmit power control (TPC) command for physical uplink control channel (PUCCH) | This indicates a transmit power control command for PUCCH which is an uplink control channel. |

In table 3, in case of PDSCH transmission, time domain resource assignment may be expressed by information on a slot for PDSCH transmission, a start symbol position S in that slot, and the number of symbols L to which PDSCH is mapped. Here, S may be a relative position from the start of the slot, L may be the number of consecutive symbols, and S and L may be determined from a start and length indicator value (SLIV) defined as in Table 4 below.

TABLE 4 if (L − 1) ≤ 7 then
SLIV = 14 · (L − 1) + S
else
SLIV = 14 · (14 − L + 11) + (14 − 1 − S)
where 0 < L ≤ 14 − S In the NR system, generally through RRC configuration, information about corresponding relationship among an SLIV value, a PDSCH or physical uplink shared channel (PUSCH) mapping type, and a slot for PDSCH or PUSCH transmission may be configured in one row. Thereafter, by indicating an index value defined in the configured corresponding relationship through time domain resource allocation of DCI, the base station may provide the UE with information on the SLIV value, the PDSCH or PUSCH mapping type, and the slot for PDSCH or PUSCH transmission.

In the NR system, the PDSCH or PUSCH mapping type is defined as type A and type B. In case of the PDSCH or PUSCH mapping type A, a demodulation reference signal (DMRS) symbol starts in the second or third OFDM symbol in the slot. In case of the PDSCH or PUSCH mapping type B, the DMRS symbol starts in the first OFDM symbol of the time domain resource allocated for PUSCH transmission.

The DCI may be transmitted on a physical downlink control channel (PDCCH) after a channel coding and modulation process. The PDCCH may be used for referring to control information itself rather than a channel. In general, the DCI is scrambled using a specific radio network temporary identifier (RNTI) or UE identifier independently for each UE, adds a cyclic redundancy check (CRC), is channel-coded, is configured with each independent PDCCH, and is transmitted. The PDCCH is mapped to a control resource set (CORESET) configured for the UE.

Downlink data may be transmitted on a physical downlink shared channel (PDSCH), which is a physical channel for downlink data transmission. The PDSCH may be transmitted after a control channel transmission interval, and scheduling information such as a specific mapping position in the frequency domain and a modulation scheme may be indicated by the DCI transmitted through the PDCCH. Through the MCS among control information types constituting the DCI, the base station notifies the UE of a modulation scheme applied to the PDSCH to be transmitted and the size (transport block size, TBS) of data to be transmitted. In an embodiment, the MCS may consist of 5 bits or more or fewer bits. The TBS may correspond to the size before the channel coding for error correction is applied to data (transport block, TB) to be transmitted by the base station.

In the disclosure, the transport block (TB) may contain a medium access control (MAC) header, a MAC control element (CE), one or more MAC service data units (SDUs), and padding bits. Alternatively, the TB may indicate a data unit or MAC protocol data unit (PDU) that is delivered from the MAC layer to the physical layer.

The modulation schemes supported in the NR system are quadrature phase shift keying (QPSK), 16 quadrature amplitude modulation (16 QAM), 64 QAM, and 256 QAM, and each modulation order (Qm) corresponds to 2, 4, 6, or 8. That is, 2 bits per symbol may be transmitted in case of QPSK, 4 bits per symbol in case of 16 QAM, 6 bits per symbol in case of 64 QAMn, and 8 bits per symbol in case of 256 QAM. If 1024 QAM is supported, 10 bits per symbol of 1024 QAM may be mapped and transmitted.

Figure 6A:
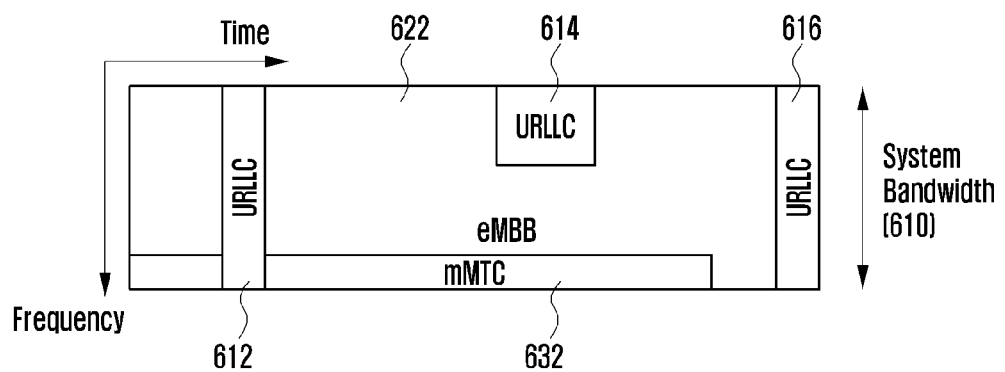
FIG. 6A illustrates an example of allocation of data for respective services to a frequency-time resource in a wireless communication system according to various embodiments of the disclosure.
Figure 6B:
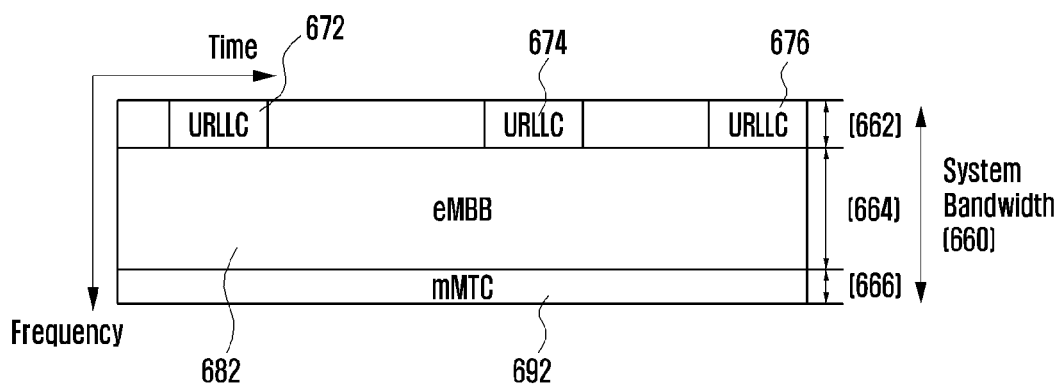
FIG. 6B illustrates another example of allocation of data for respective services to a frequency-time resource in a wireless communication system according to various embodiments of the disclosure.

In terms of service, the NR system is designed to freely multiplex various services in time and frequency resources, so that waveform/numerology, reference signals, etc. can be adjusted dynamically or freely. In order to provide an optimal service to the UE in wireless communication, it is important to optimize data transmission through measurement of channel quality and interference, and thus accurate channel state measurement is essential. However, the channel and interference characteristics change greatly depending on services in case of the 5G channel unlike 4G communication in which the channel and interference characteristics change significantly depending on frequency resources, so it is necessary to support a subset of the frequency resource group (FRG) dimension for separately measuring them. Meanwhile, the NR system may divide the types of supported services into enhanced mobile broadband (eMBB), massive machine type communications (mMTC), and ultra-reliable and low-latency communications (URLLC). The eMBB is a service that aims for a high-speed transmission of high-capacity data, the mMTC is a service that aims for minimization of UE power and access of multiple UEs, and the URLLC is a service that aims for high reliability and low latency. Depending on the type of a service applied to the UE, different requirements may be applied. Examples of resource allocation for respective services are shown in FIGS. 6A and 6B. Hereinafter, referring to FIGS. 6A and 6B, a scheme of allocating frequency and time resources for information transmission in each system will be described.

FIG. 6A illustrates an example of allocation of data for respective services to a frequency-time resource in a wireless communication system according to various embodiments of the disclosure.

In case of FIG. 6A, in the entire system frequency band 610, resources are allocated for eMBB 622, URLLC 612, 614, 616, and mMTC 632. In case that data of the URLLC 612, 614, 616 is needed while data of the eMBB 622 and data of the mMTC 632 are allocated and transmitted in a specific frequency band, the data of the URLLC 612, 614, 616 may be transmitted by emptying or not transmitting a part already allocated for the eMBB 622 and the mMTC 632. Because the URLLC needs to reduce a latency time, a resource for transmitting the data of the URLLC 612, 614, 616 may be allocated in a part of the resource allocated for the eMBB 622. Of course, in case that the URLLC 612, 614, 616 is additionally allocated to and transmitted in the resource allocated for the eMBB 622, the data of the eMBB 622 may not be transmitted in overlapped frequency-time resources, and thus the transmission performance of the data of the eMBB 622 may be lowered. That is, in this case, a failure in data transmission of the eMBB 622 may occur due to the allocation of resources for the URLLC 612, 614, 616. This scheme as shown in FIG. 6A may be referred to as a preemption scheme.

FIG. 6B illustrates another example of allocation of data for respective services to a frequency-time resource in a wireless communication system according to various embodiments of the disclosure.

FIG. 6B shows an example in which each service is provided in each of sub-bands 662, 664, and 666 into which the entire system frequency band 660 is divided. Specifically, a sub-band 662 is used for data transmission of URLLC 672, 674, 576, a sub-band 664 is used for data transmission of eMBB 682, and a sub-band 666 is used for data transmission of mMTC 692. Information related to the configuration of the sub-bands 662, 664, and 666 may be predetermined and may be transmitted from a base station to a UE through higher level signaling. Alternatively, the division of sub-bands 662, 664, and 666 may be arbitrarily made by a base station or a network node, and thus services may be provided to a UE without separate transmission of sub-band configuration information.

According to various embodiments, a length of a transmission time interval (TTI) used for URLLC transmission may be shorter than a TTI length used for eMBB or mMTC transmission. In addition, a response of information related to URLLC may be transmitted faster than eMBB or mMTC, so that the UE can transmit and receive information with low latency. Structures of physical layer channels used for respective types to transmit the above-described three services or data may be different. For example, at least one of a length of a TTI, an allocation unit of a frequency resource, a structure of a control channel, and a data mapping method may be different.

Although three service types and three data types have been described above, more service types and corresponding data types may exist, and even in this case, various embodiments described herein may also be applied.

Figure 7:
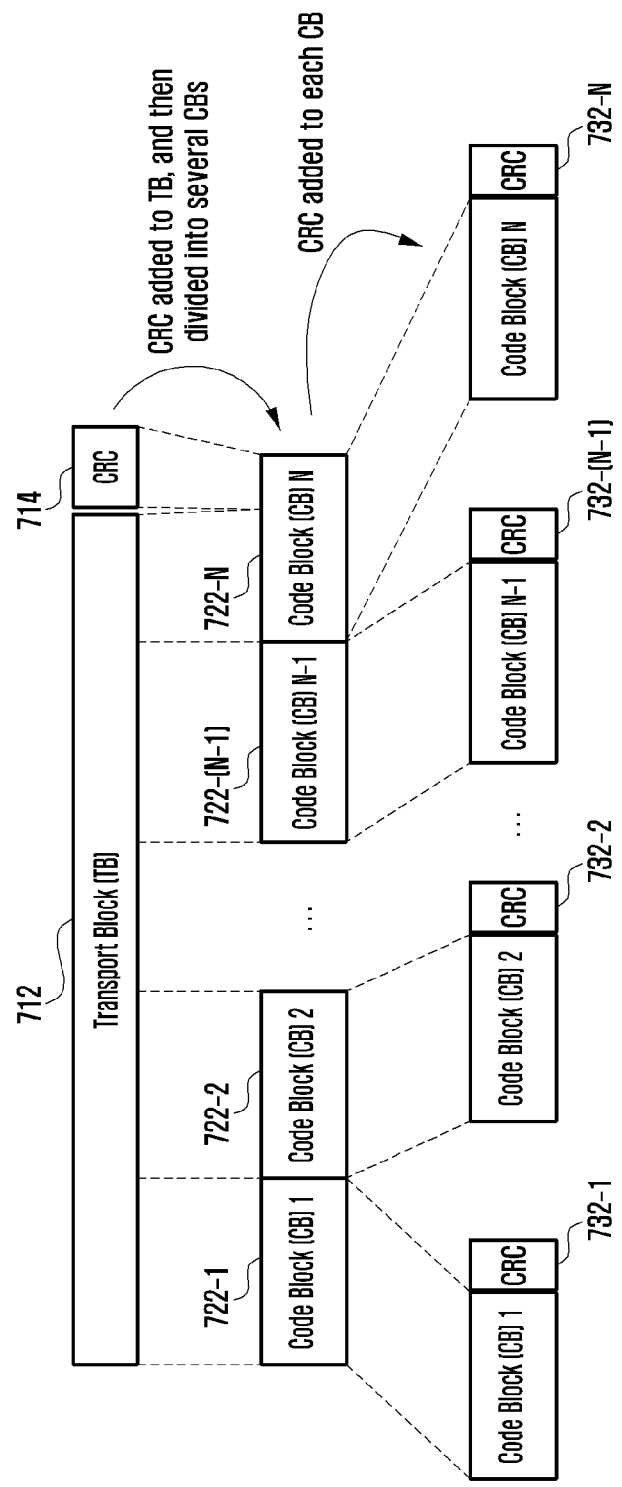
FIG. 7 illustrates a data encoding scheme in a wireless communication system according to various embodiments of the disclosure.

FIG. 7 illustrates a data encoding scheme in a wireless communication system according to various embodiments of the disclosure.

FIG. 7 exemplarily shows that one TB is segmented into several code blocks (CBs) and CRC is added.

With reference to FIG. 7, a CRC 714 may be added to the last or front part of one TB 712 to be transmitted in uplink or downlink. The CRC 714 may have 16 bits, 24 bits, a predetermined number of bits, or a variable number of bits depending on a channel condition, and may be used to determine whether or not channel coding is successful. The TB 712 and a block of the added CRC 714 may be divided into several CBs 722-1, 722-2, 722-(N−1), and 722-N. The division of the CBs may be made based on a predefined size. In this case, the last CB 722-N may have a smaller size than the other CBs, or it may have the same length as the other CBs by adding 0, a random value, or 1. In addition, CRCs 732-1, 732-2, 732-(N−1), and 732-N may be added to the divided CBs, respectively. Each of the CRCs 732-1, 732-2, 732-(N−1), and 732-N may have 16 bits, 24 bits, or a predetermined number of bits, and may be used to determine whether channel coding succeeds in a receiver.

The TB 712 and a cyclic generator polynomial may be used to generate the CRC 714. The cyclic generator polynomial may be defined variously. For example, assuming that the cyclic generator polynomial for 24-bit CRC is $gCRC24A(D)=D^{24}+D^{23}+D^{18}+D^{17}+D^{14}+D^{11}+D^{10}+D^7+D^6+D^5+D^4+D^3+D+1$, and that L is 24, the CRC p1,p2, . . . , pL−1 for TB data a0,a1,a2,a3, . . . , aA−1 may be determined as a value that when dividing $a0D^{A+23}+a1D^{A+22}+ \ldots aA-1D^{24}+p0D^{23}+p1D^{22}+ \ldots p22D^1+p23$ by gCRC24A(D), the remainder becomes zero. Although a case that the CRC length L is 24 has been described above, the CRC length L may be determined to have various lengths such as 12, 16, 24, 32, 40, 48, 64, and the like.

After the CRC is added to the TB as described above, the sum of the TB and the CRC can be divided into N CBs 722-1, 722-2, 722-(N−1), and 722-N. The CRCs 732-1, 732-2, 732-(N−1), and 732-N may be added to the CBs 722-1, 722-2, 722-(N−1), and 722-N, respectively. The CRC added to the CB may have a length different from that of the CRC added to the TB, or may use a different cyclic generator polynomial. However, the CRC 714 added to the TB and the CRCs 732-1, 732-2, 732-(N−1), and 732-N added to the CBs 722-1, 722-2, 722-(N−1), and 722-N may be omitted depending on the type of channel code to be applied to the CB. For example, when a low density parity code (LDPC), not a turbo code, is applied to the CB, the CRCs 732-1, 732-2, 732-(N−1), and 732-N to be added for the respective CBs may be omitted. However, even when the LDPC is applied, the CRCs 732-1, 732-2, 732-(N−1), and 732-N may be added to the CBs 722-1, 722-2, 722-(N−1), and 722-N. Also, even when a polar code is used, such a CRC may be added or omitted.

As shown in FIG. 7, for the TB to be transmitted, the maximum length of one CB is determined depending on the type of channel coding applied, and the TB and the CRC added to the TB are divided into CBs in accordance with the maximum length of the CB. In the LTE system, a CRC for a CB is added to a divided CB. Data bits of the CB and the CRC are encoded with channel code, thereby coded bits are determined, and as promised in advance, the number of bits for rate matching is determined for the respective coded bits.

Figure 8:
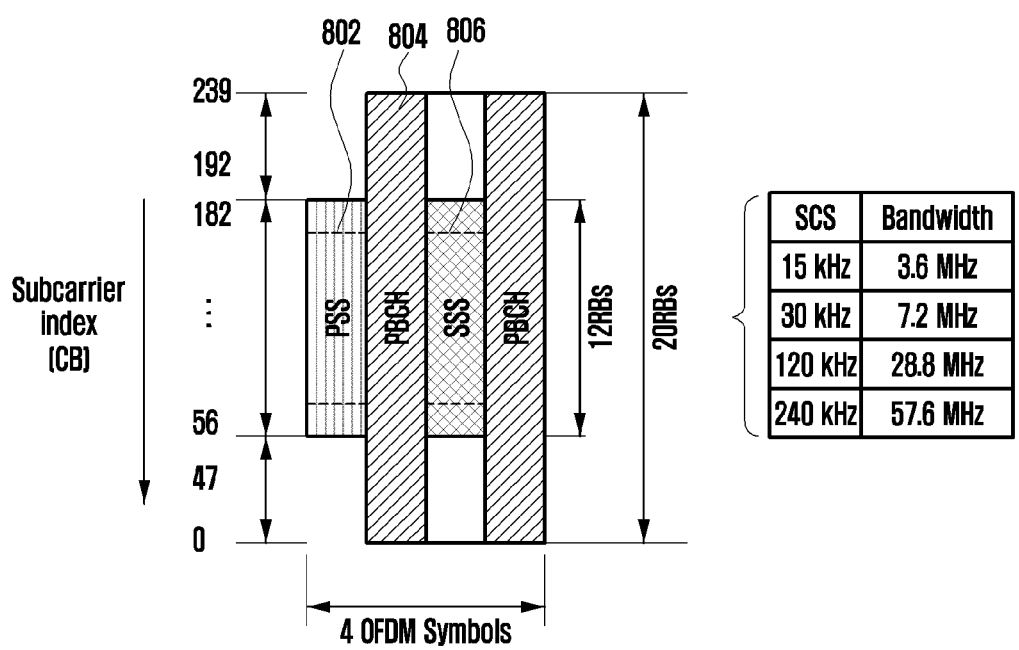
FIG. 8 illustrates a mapping of a synchronization signal and a broadcast channel in a wireless communication system according to various embodiments of the disclosure.

FIG. 8 illustrates a mapping of a synchronization signal and a broadcast channel in a wireless communication system according to various embodiments of the disclosure.

FIG. 8 shows an example of a mapping result of synchronization signals and a physical broadcast channel (PBCH) in the frequency and time domains of the 3GPP NR system. A primary synchronization signal (PSS) 802, a secondary synchronization signal (SSS) 806, and a PBCH 804 are mapped over four OFDM symbols. The PSS 802 and the SSS 806 are mapped to 12 RBs, and the PBCH 804 is mapped to 20 RBs. A frequency bandwidth of 20 RBs according to subcarrier spacing (SCS) is shown in FIG. 8. A set of the PSS 802, the SSS 806, and the PBCH 804, or a resource region carrying the PSS 802, the SSS 806, and the PBCH 804 may be referred to an SS/PBCH block (SS block, SSB).

Figure 9:
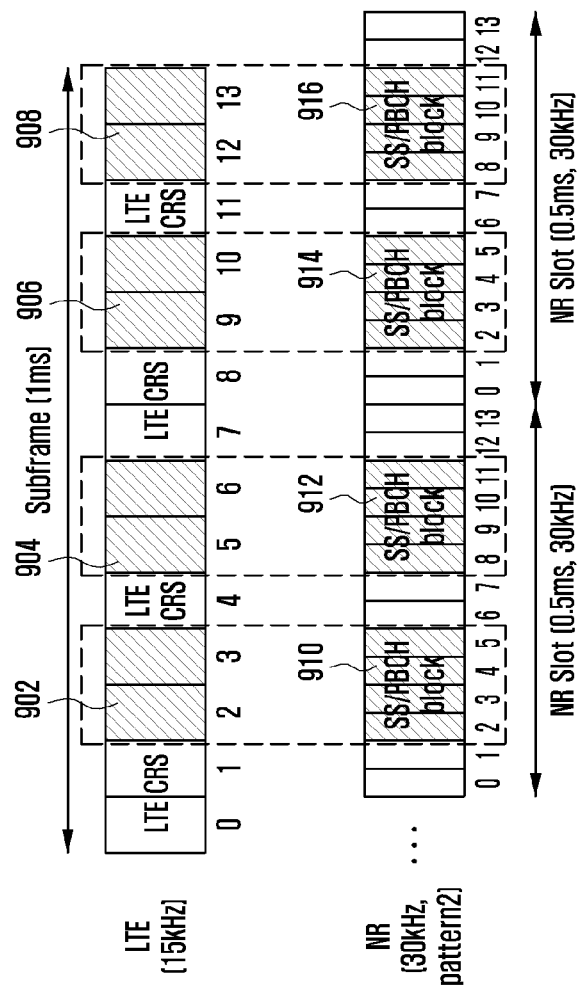
FIG. 9 illustrates an example of arrangement of a synchronization signal/physical broadcast channel block (SSB) in a wireless communication system according to various embodiments of the disclosure.

FIG. 9 illustrates an example of arrangement of SSB in a wireless communication system according to various embodiments of the disclosure.

FIG. 9 shows an example that one SSB is mapped to symbols within a slot in the LTE system using a subcarrier spacing of 15 kHz and in the NR system using a subcarrier spacing of 30 kHz. With reference to FIG. 9, SSBs 910, 912, 914, and 916 of the NR system are transmitted at positions 902, 904, 906, and 908 that do not overlap with cell-specific reference signals (CRSs) that are always transmitted in the LTE system. The design shown in FIG. 9 may be to enable the LTE system and the NR system to coexist in one frequency band.

Figure 10A:
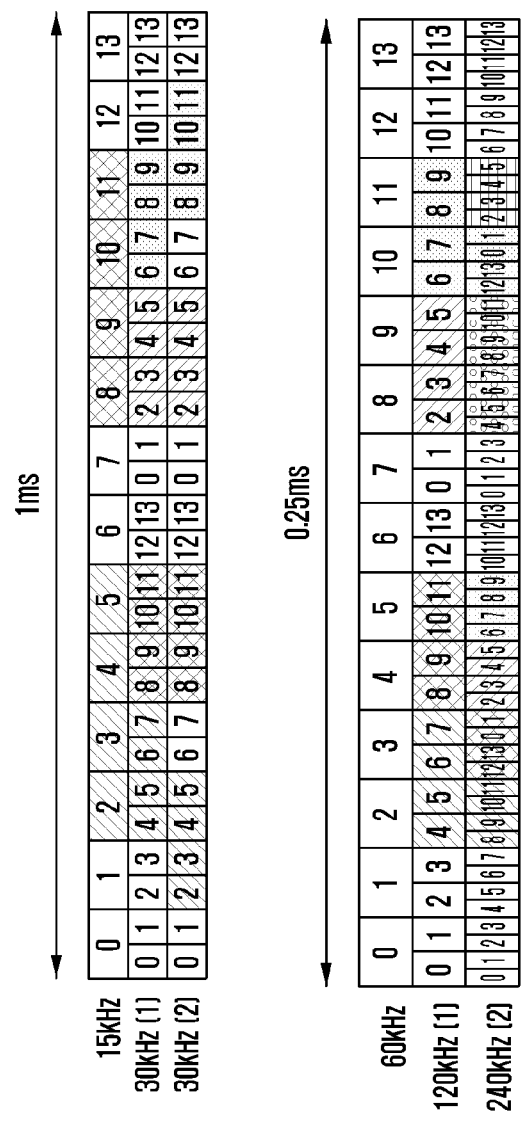
FIGS. 10A and 10B illustrate transmittable symbol positions of an SSB depending on a subcarrier spacing in a wireless communication system according to various embodiments of the disclosure.
Figure 10B:
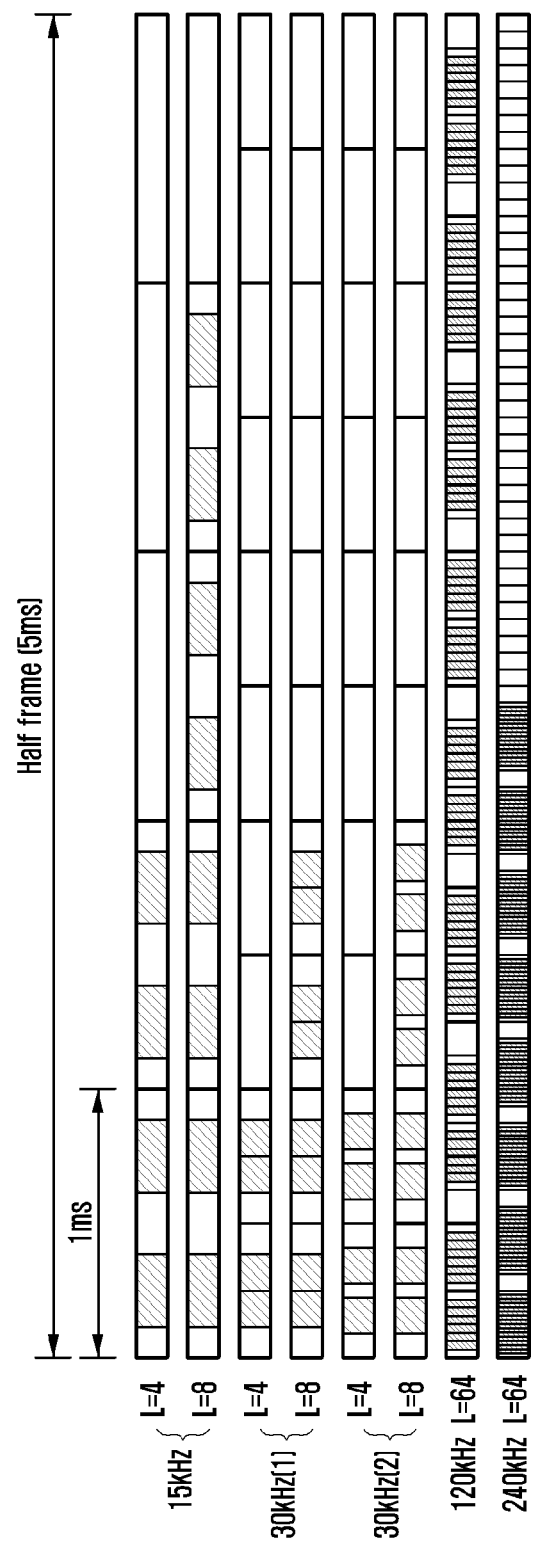

FIGS. 10A and 10B illustrate transmittable symbol positions of an SSB depending on a subcarrier spacing in a wireless communication system according to various embodiments of the disclosure. FIG. 10A shows symbol positions at which the SSB can transmit within an interval of 1 ms, and FIG. 10B within an interval of 5 ms. In the SSB transmittable region shown in FIGS. 10A and 10B, the SSB does not always have to be transmitted, and the SSB may or may not be transmitted according to the selection of the base station.

In the wireless communication system according to various embodiments, the size of the TB may be determined through the following steps.

Step 1: The number of REs, $N_{RE}'$, allocated to PDSCH mapping in one PRB in the allocated resource is calculated. $N_{RE}'$ can be calculated as $$N_{RE}' = N_{sc}^{RB} \cdot N_{symb}^{sh} - N_{DMRS}^{PRB} - N_{oh}^{PRB}.$$

Here, $N_{SC}^{RB}$ denotes the number of subcarriers (e.g., 12) included in one RB, $N_{symb}^{sh}$ denotes the number of OFDM symbols allocated to PDSCH, $N_{DMRS}^{PRB}$ denotes the number of REs in one PRB occupied by demodulation reference signals (DMRSs) of the same code division multiplexing (CDM) group, and $N_{oh}^{PRB}$ denotes the number of REs (e.g., configured as one of 0, 6, 12, and 18) occupied by an overhead in one PRB configured via higher signaling. Thereafter, the total number of REs $N_{RE}$ allocated to PDSCH can be calculated. $N_{RE}$ is calculated as $N_{RE} = \min(156, N_{RE}') \cdot n_{PRB}$. Here, $n_{PRB}$ indicates the number of PRBs allocated to the UE.

Step 2: The number of temporary information bits $N_{info}$ can be calculated as $N_{RE} \cdot R \cdot Q_m \cdot v$. Here, R denotes a code rate, $Q_m$ denotes a modulation order, and v denotes the number of allocated layers. The code rate and the modulation order may be transmitted using a predefined corresponding relationship with an MCS field included in the control information. If $N_{info} \leq 3824$, TBS can be calculated through step 3 below. Otherwise, TBS can be calculated through step 4.

Step 3: $N_{info}'$ can be calculated via Equations of $$N_{info}' = \max\left(24, 2^n \cdot \left\lfloor \frac{N_{info}}{2^n} \right\rfloor\right)$$

and n=max $(3, \log_2(N_{info})-6)$. TBS may be determined as a value closest to $N_{info}'$ among values not smaller than $N_{info}'$ in Table 5 below.

TABLE 5

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |

TABLE 5-continued

| Index | TBS |
|---|---|
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Step 4: $N_{info}'$ can be calculated through Equations of $$N_{info}' = \max\left(3840, 2^n \times \text{round}\left(\frac{N_{info} - 24}{2^n}\right)\right)$$

and n=$[\log_2(N_{info}-24)]-5$. TBS may be determined through the $N_{info}$' value and the Pseudo-code 1 as shown in Table 6.

TABLE 6 if R ≤ 1/4

$$TBS = 8 \cdot C \cdot \left\lceil \frac{N'_{info} + 24}{8 \cdot C} \right\rceil - 24, \text{ where } C = \left\lceil \frac{N'_{info} + 24}{3816} \right\rceil$$

else
  if $N'_{info} > 8424$ $$TBS = 8 \cdot C \cdot \left\lceil \frac{N'_{info} + 24}{8 \cdot C} \right\rceil - 24, \text{ where } C = \left\lceil \frac{N'_{info} + 24}{8424} \right\rceil$$

else $$TBS = 8 \cdot \left\lceil \frac{N'_{info} + 24}{8} \right\rceil - 24$$

end if
    end if

When one code block (CB) is inputted to an LDPC encoder, parity bits may be added and outputted. In this case, the amount (size) of parity bits may vary according to an LDCP base graph. Depending on the type of rate matching, all parity bits generated by LDPC coding may be transmittable or only some may be transmittable. A method of processing all parity bits generated by LDPC coding to be transmittable is referred to as 'full buffer rate matching (FBRM)', and a method of limiting the number of transmittable parity bits is 'limited buffer rate matching (LBRM)'. When resources are allocated for data transmission, the LDPC encoder output is inputted to a circular buffer, and bits of the buffer are repeatedly transmitted as much as the allocated resources.

If the length of the circular buffer is Neb and the number of all parity bits created by LDPC coding is N, Neb becomes N in case of the FBRM method. In case of the LBRM method, $N_{cb}$ becomes min (N, $N_{ref}$), $N_{ref}$ is given as $$\left\lfloor \frac{TBS_{LBRM}}{C \cdot R_{LBRM}} \right\rfloor,$$

and $R_{LBRM}$ may be determined to be 2/3. To determine $TBS_{LBRM}$, the above-described TBS determination method may be used. In this case, C is the actual number of code blocks of the scheduled TB. Also, the number of layers is assumed to be the maximum number of layers supported by the UE in the cell, and the modulation order is assumed to be the maximum modulation order configured for the UE in the cell or, if not configured, to be 64-QAM. The code rate is assumed to be the maximum code rate of 948/1024, $N_{RE}$ is assumed as 156·$n_{PRB}$, and $n_{PRB}$ may be assumed as $n_{PRB,LBRM}$, where $n_{PRB,LBRM}$ may be defined as in Table 7 below.

TABLE 7

| Maximum number of PRBs across all configured BWPs of a carrier | $n_{PRB,LBRM}$ |
| --- | --- |
| Less than 33 | 32 |
| 33 to 66 | 66 |

TABLE 7-continued

| Maximum number of PRBs across all configured BWPs of a carrier | $n_{PRB,LBRM}$ |
| --- | --- |
| 67 to 107 | 107 |
| 108 to 135 | 135 |
| 136 to 162 | 162 |
| 163 to 217 | 217 |
| Larger than 217 | 273 |

In the wireless communication system according to various embodiments, the maximum data rate supported by the UE may be determined through the following Equation 1.

[Equation 1]

data rate (in Mbps) =

$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j)} \cdot 12}{T_s^{\mu}} \cdot (1 - OH^{(j)}) \right)$$

In Equation 1, J is the number of carriers bound by carrier aggregation (CA), $R_{max}$ is 948/1024, $v_{Layers}^{(j)}$ is the maximum layer number of a carrier having an index j, $Q_m^{(j)}$ is the maximum modulation order of a carrier having an index j, $f^{(j)}$ is a scaling factor of a carrier having an index j, and μ denotes a subcarrier spacing. The UE may report $f^{(j)}$ as one of 1, 0.8, 0.75, and 0.4, and μ may be given as in Table 8 below.

TABLE 8

| μ | Δf = $2^{\mu}$ · 15[kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

Here, $T_s^{\mu}$ is an average OFDM symbol length, $T_s^{\mu}$'s can be calculated as $$\frac{10^{-3}}{14 \cdot 2^{\mu}},$$

and $N_{PRB}^{BW(j),\mu}$ is the maximum number of RBs in BW(j). $OH^{(j)}$ is an overhead value and may be given as 0.14 in downlink and 0.18 in uplink of FR1 (e.g., 6 GHz or 7.125 GHz band or less) and given as 0.08 in downlink and 0.10 in uplink of FR2 (e.g., 6 GHz or 7.125 band or more). Through Equation 1, the maximum data rate in the downlink in a cell having a 100 MHz frequency bandwidth at a 30 kHz subcarrier spacing can be calculated as Table 9 below.

TABLE 9

| $f^{(j)}$ | $V_{Layers}^{(j)}$ | $Q_m^{(j)}$ | Rmax | $N_{PRB}^{BW\,(j),\,\mu}$ | $T_s^\mu$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

On the other hand, an actual data rate that the UE can measure in actual data transmission may be a value obtained by dividing the amount of data by the data transmission time. This may be a value obtained by dividing a TB size (TBS) in 1-TB transmission or the sum of TBSs in 2-TB transmission by the TTI length. For example, the maximum actual data rate in the downlink in a cell having a 100 MHz frequency bandwidth at a 30 kHz subcarrier spacing may be defined as in Table 10 below according to the number of allocated PDSCH symbols.

TABLE 10

| $N_{symb}^{sh}$ | $N_{DMRS}^{PRB}$ | $N'_{RE}$ | $N_{RE}$ | $N_{info}$ | n | $N'_{info}$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

The maximum data rate supported by the UE can be identified through Table 9, and the actual data rate according to the allocated TBS can be identified through Table 10. In this case, depending on scheduling information, there may be a case where the actual data rate is greater than the maximum data rate.

In the wireless communication system, particularly, the New Radio (NR) system, a data rate that the UE can support may be mutually agreed upon between the base station and the UE. This may be calculated using the maximum frequency band supported by the UE, the maximum modulation order, the maximum number of layers, and the like. However, the calculated data rate may be different from a value calculated from a transport block size (TBS) and a transmission time interval (TTI) length used for actual data transmission. Therefore, the UE may be allocated a TBS greater than a value corresponding to a data rate supported by the terminal. To prevent this, there may be restrictions on the TBS that can be scheduled depending on the data rate supported by the UE. It may be necessary to minimize this case and define the operation of the UE in this case. In addition, when LBRM is applied in the communication system defined in the current NR, TBSLBRM is determined based on the number of layers or ranks supported by the UE. However, this process is inefficient or parameter configuration is ambiguous, so there arises a problem in that it is difficult to stably apply LBRM in the base station or the UE. Hereinafter, the disclosure describes various embodiments for solving the above problems.

Figure 11:
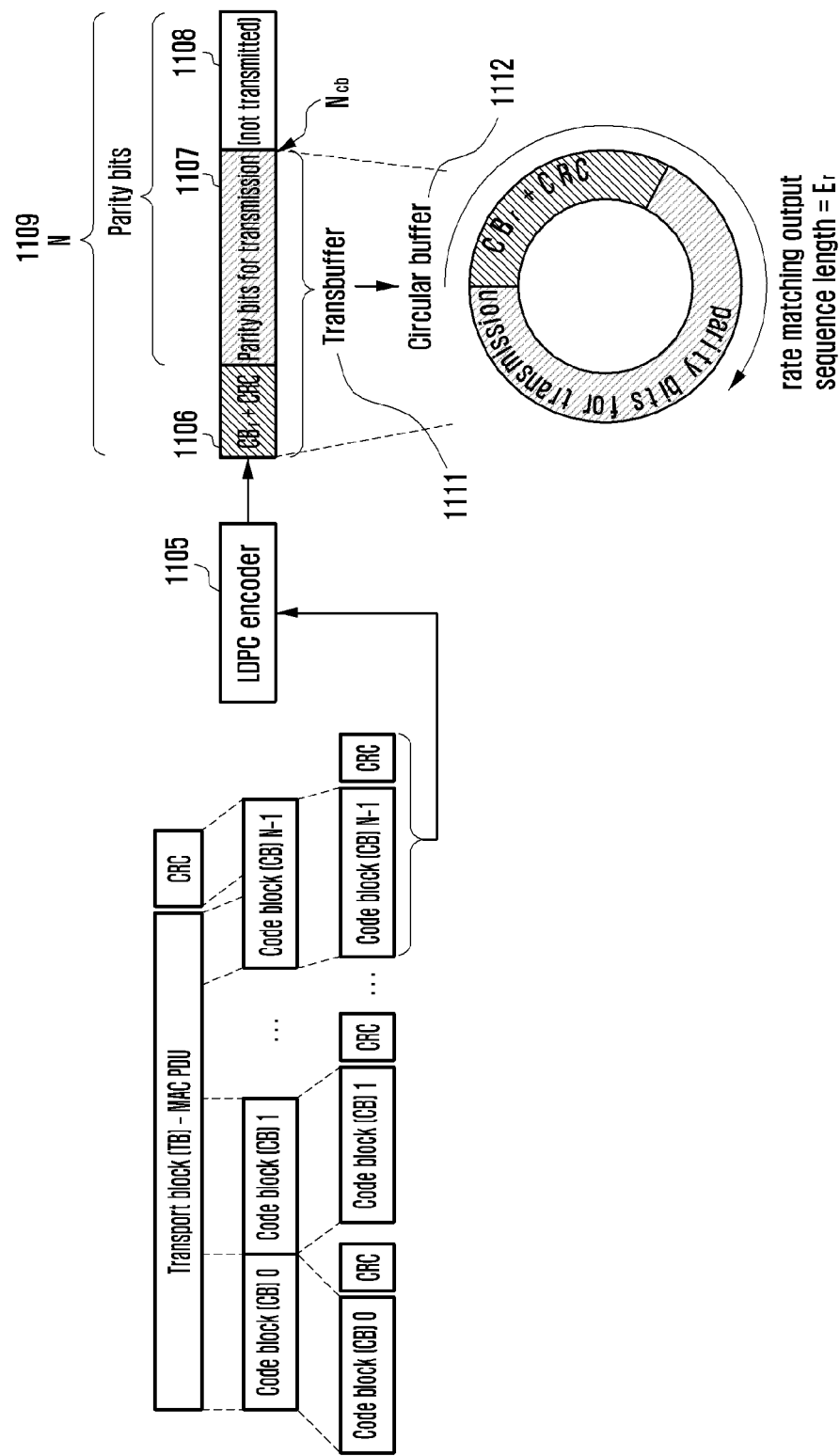
FIG. 11 illustrates an example of generation and transmission of parity bits in a wireless communication system according to various embodiments of the disclosure.

FIG. 11 illustrates an example of generation and transmission of parity bits in a wireless communication system according to various embodiments of the disclosure.

FIG. 11 is an example process of dividing data to be transmitted into code blocks, generating parity bits by applying channel coding to the divided CBs, and determining and transmitting the parity bits to be transmitted.

With reference to FIG. 11, one CB is transmitted to a channel encoder 1105, and data bits 1106 and parity bits 1107 and 1108 are generated by the channel encoder 1105. For example, the channel encoder 1105 may perform encoding using LDPC, a polar code, or any other channel code. In this case, the amount of generated parity bits may vary according to the type and details of the channel code. If the total length of bits 1109 generated by encoding of the channel encoder 1105 is N bits, and when all the parity bits 1107 and 1108 are transmitted, a receiver may need a soft buffer or memory capable of storing reception information of N bits. If the receiver uses a soft buffer having a size smaller than N bits, reception performance may be deteriorated.

In order to reduce the required soft buffer size, a method of determining not transmitted parity bits 1108 and not transmitting the determined parity bits 1108 may be used. That is, the data bits 1106 and the parity bits 1107 only are inputted to a transmit buffer 1111, transferred to a circular buffer (soft buffer) 1112, and transmitted. That is, transmittable parity bits may be limited, and the limited amount is the sum of the size of the data bits 1106 and the size of the parity bits 1107 and may be referred to as Neb. When Neb is N, it means that transmittable parity bits are not limited, which means that all parities generated by the channel code are transmitted. As such, a method of processing all parity bits to be transferable may be referred to as full buffer rate matching (FBRM). On the other hand, Neb is determined as $N_{cb}=\min(N, N_{ref})$, and transmittable parity bits may be limited as $$N_{ref} = \left\lfloor \frac{TBS_{LBRM}}{C \cdot R_{LBRM}} \right\rfloor.$$

As such, a method of limiting the number of transmittable parity bits is referred to as 'limited buffer rate matching (LBRM)'.

In embodiments described hereinafter, a base station, which is a subject that allocates resources of a terminal, may be a base station supporting both V2X communication and general cellular communication, or a base station supporting only V2X communication. That is, the base station may refer to a gNB, an eNB, or a road site unit (RSU) (or fixed station). A terminal may be one of a user equipment (UE), a mobile station, a vehicle supporting vehicle-to-vehicle (V2V) communication, a vehicle or pedestrian's handset (e.g., a smartphone) supporting vehicle-to-pedestrian (V2P) communication, a vehicle supporting vehicle-to-network (V2N) communication, a vehicle supporting vehicle-to-infrastructure (V2I) communication, an RSU equipped with a terminal function, an RSU equipped with a base station function, or an RSU equipped with a part of base station function and a part of terminal function.

In the V2X environment, data may be transmitted from one UE to a plurality of UEs, or data may be transmitted from one UE to one UE. Alternatively, data may be transmitted from the base station to a plurality of UEs. However, the disclosure is not limited to the above case and may be applied to various cases.

In order to transmit and receive in the sidelink, the UE operates based on a resource pool that is predefined, configured, or preconfigured between UEs. The resource pool may be a set of frequency and time domain resources that can be used for transmission and reception of a sidelink signal. That is, the transmission/reception of a sidelink signal should be performed in frequency-time resources predetermined to transmit/receive the sidelink signal, and such resources are defined as a resource pool. The resource pool may be defined separately for transmission and reception and may be defined and used in common for transmission and reception. In addition, UEs may be configured with one or a plurality of resource pools and perform transmission/reception of a sidelink signal. Configuration information about the resource pool used for sidelink transmission/reception and any other configuration information for the sidelink are pre-installed when the UE is produced, are configured from the current base station, are pre-configured from another base station or any other network unit before access to the current base station, are fixed values, are provisioned from the network, or are self-constructed by the UE.

In order to indicate a frequency domain resource of the resource pool, the base station may indicate a start index and length (e.g., the number of PRBs) of a PRB belonging to the resource pool. However, this is not a limitation, and one resource pool may be configured by indicating PRBs using a bitmap. In addition, in order to indicate a time domain resource of the resource pool, the base station may indicate indexes of OFDM symbols or slots belonging to the resource pool in units of bitmaps. Alternatively, according to another method, the system may define that slots satisfying a predetermined formula in a specific set of slots belong to a corresponding resource pool. In configuring the time domain resource, the base station may notify, for example, by using a bitmap, which slots among slots for a specific time belong to a specific resource pool, and in this case, whether it corresponds to a resource pool of time resources for each specific time may be indicated according to a bitmap.

Meanwhile, a sub-channel may be defined in units of resources on a frequency including a plurality of RBs. In other words, the sub-channel may be defined as an integer multiple of RB. The sizes of the sub-channels may be configured to be identical with or different from each other, and although one sub-channel is generally composed of consecutive PRBs, there is no limitation that it must be composed of consecutive PRBs. The sub-channel may be a basic unit of resource allocation for a physical sidelink shared channel (PSSCH) or a physical sidelink control channel (PSCCH). Therefore, depending on whether the corresponding channel is the PSSCH or the PSCCH, the size of the sub-channel may be configured differently. In addition, the term of the sub-channel may be replaced with another term such as a resource block group (RBG), a set of RBGs, or a set of PRBs.

For example, 'startRBSubchanel', which is higher level signaling or configuration information, may indicate the start position of a sub-channel on a frequency in the resource pool. For example, in the LTE V2X system, a resource block, which is the frequency resource belonging to the resource pool for PSSCH, may be determined as in Table 11 below.

TABLE 11

The resource block pool consists of $N_{subCH}$ sub-channels where $N_{subCH}$ is given by higher layer parameter numSubchannel. The sub-channel m for m = 0, 1, . . . , $N_{subCH}-1$ consists of a set of $n_{subCHsize}$ contiguous resource blocks with the physical resource block number $n_{PRB} = n_{subCHRBstart} + m*n_{subCHsize} + j$ for j = 0, 1, . . . , $N_{subCH}-1$ where $n_{subCHRBstart}$ and $n_{subCHsize}$ are given by higher layer parameters startRBSubchannel and sizeSubchannel, respectively For resource pool configuration, the granularity of resource allocation in time may be a slot. In the disclosure, the resource pool is exemplified as non-contiguously allocated slots in time, but the resource pool may be contiguously allocated in time or configured in units of symbols.

In another example, when 'startSlot', which is higher signaling or configuration information, indicates the start position of a slot in time in the resource pool, subframes, $(t_0^{SL}, t_1^{SL}, \ldots, t_{T_{max}}^{SL})$, which are time resources belonging to the resource pool for PSSCH in the LTE V2X system, may be determined as in Table 12 below.

TABLE 12

$0 \leq t_i^{SL} < 10240$,
the subframe index is relative to subframe#0 of the radio frame corresponding to SFN 0 of the serving cell or DEN 0 (described in [11]),
the set includes all the subframes except the following subframes,
subframes in which SLSS resource is configured,
downlink subframes and special subframes if the sidelink transmission occurs in a TDD cell,
reserved subframes which are determined by the following steps:
1) the remaining subframes excluding Nsiss and Nassf subframes from the set of all the subframes are denoted by $(l_0, l_1, \ldots, l_{(10240-N_{slss}-N_{dssf}-1)})$ arranged in increasing TABLE 12-continued order of subframe index, where $N_{slss}$ is the number of subframes in which SLSS resource is configured within 10240 subframes and $N_{dssf}$ is the number of downlink subframes and special subframes within 10240 subframes if the sidelink transmission occurs in a TDD cell.

2) a subframe $l_r(0 \leq r < (10240 - N_{slss} - N_{dssf}))$ belongs to the recieved subframes if $r = \left\lfloor \dfrac{m \cdot (10240 - N_{slss} - N_{dssf})}{N_{reserved}} \right\rfloor$ where $m = 0, \ldots, N_{reserved} - 1$ and $N_{reserved} = (10240 - N_{slss} - N_{dssf}) \bmod L_{bitmap}$. Here, $L_{bitmap}$ the length of the bitmap is configured by higher layers.

the subframes are arranged in increasing order of subframe index.

A bitmap $(b_0, b_1, \ldots, b_{L_{bitmap}-1})$ associated with the resource pool is used where $L_{bitmap}$ the length of the bitmap is configured by higher layers.

A subframe $t_k^{SL}$ $(0 \leq k < (10240 - N_{slss} - N_{dssf} - N_{reserved}))$ belongs to the subframe pool if $b_{k'} = 1$ where $k' = k \bmod L_{bitmap}$.

According to the procedure of Table 12, except for at least one slot used for downlink among slots (subframes in Table 12) for a specific period, the bitmap indicates which slots are included in the resource pool, and a slot among the slots indicated to be included in the resource pool is indicated to belong to the resource pool according to bitmap information.

A sidelink control channel may be referred to as a physical sidelink control channel (PSCCH), and a sidelink shared channel or data channel may be referred to as a physical sidelink shared channel (PSSCH). In addition, a broadcast channel broadcasted together with a synchronization signal may be referred to as a physical sidelink broadcast channel (PSBCH), and a channel for feedback transmission may be referred to as a physical sidelink feedback channel (PSFCH). However, the PSCCH or the PSSCH may be used for feedback transmission. Depending on communication systems, the above-described channels may be referred to as LTE-PSCCH, LTE-PSSCH, NR-PSCCH, NR-PSSCH, and the like. In the disclosure, a sidelink may mean a link between UEs, and a Uu link may mean a link between a base station and a UE.

Information transmitted in the sidelink may include sidelink control information (SCI), sidelink feedback control information (SFCI), sidelink channel state information (SCSI), and a sidelink shared channel (SL-SCH) that is a transport channel.

The above-described information and transport channel may be mapped to physical channels as shown in Table 13 and Table 14 below.

TABLE 13

| TrCH(Transport channel) | Physical Channel |
| --- | --- |
| SL-SCH | PSSCH |

TABLE 14

| Control information | Physical Channel |
| --- | --- |
| SCI | PSCCH |
| SFCI | PSFCH |
| SCSI | PSSCH |

Alternatively, when the SCSI is transmitted through the PSFCH, transport channel-physical channel mapping may be applied as shown in Table 15 and Table 16 below.

TABLE 15

| TrCH(Transport channel) | Physical Channel |
| --- | --- |
| SL-SCH | PSSCH |

TABLE 16

| Control information | Physical Channel |
| --- | --- |
| SCI | PSCCH |
| SFCI | PSFCH |
| SCSI | PSSCH, PSFCH |

Alternatively, when the SCSI is delivered to a higher layer, for example, using MAC CE, it corresponds to the SC-SCH and thus can be transmitted through the PSSCH. In this case, transport channel-physical channel mapping may be applied as shown in Table 17 and Table 18 below.

TABLE 17

| TrCH(Transport channel) | Physical Channel |
| --- | --- |
| SL-SCH | PSSCH |

TABLE 18

| Control information | Physical Channel |
| --- | --- |
| SCI | PSCCH |
| SFCI | PSFCH |
| SCSI | PSSCH, PSFCH |

When the CSI of the sidelink is transmitted through the MAC CE, a receiving UE may transmit at least one of the following additional information to a transmitting UE together.

Information on a slot in which the sidelink CSI-RS used for CSI measurement is transmitted, that is, information on timing at which the sidelink CSI-RS is transmitted Information on the frequency domain in which the CSI is measured, that is, information on the frequency domain in which the sidelink CSI-RS is transmitted. It may include an index of a sub-channel, and the like.

Information of rank indicator (RI) and channel quality indicator (CQI)

Information of preferred precoding matrix

Information related to preferred beamforming

ID information of a receiving UE that receives the sidelink CSI-RS

ID information of a transmitting UE that transmits the sidelink CSI-RS

Figure 12A:
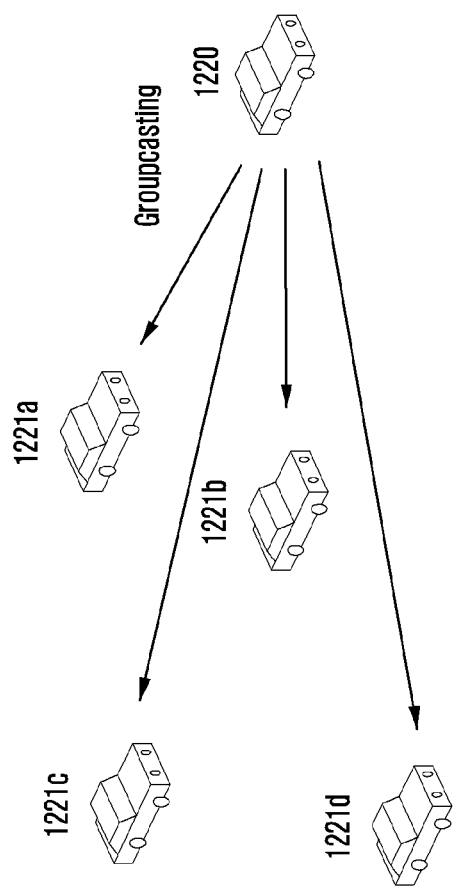
FIG. 12A illustrates an example of groupcasting transmission in a wireless communication system according to various embodiments of the disclosure.

ID information of a transmitting UE that transmits the sidelink CSI feedback information ID information of a receiving UE that receives the sidelink CSI feedback information FIG. 12A illustrates an example of groupcasting transmission in a wireless communication system according to various embodiments of the disclosure.

With reference to FIG. 12A, a UE 1220 transmits common data to a plurality of UEs 1221a, 1221b, 1221c, and 1221d, that is, transmits data in a groupcasting method. The UE 1220 and the UE 1221a, 1221b, 1221c, and 1221d may be moving devices such as vehicles. For groupcasting, at least one of separate control information (e.g., sidelink control information (SCI)), a physical control channel (e.g., physical sidelink control channel (PSCCH)), and data may be further transmitted.

Figure 12B:
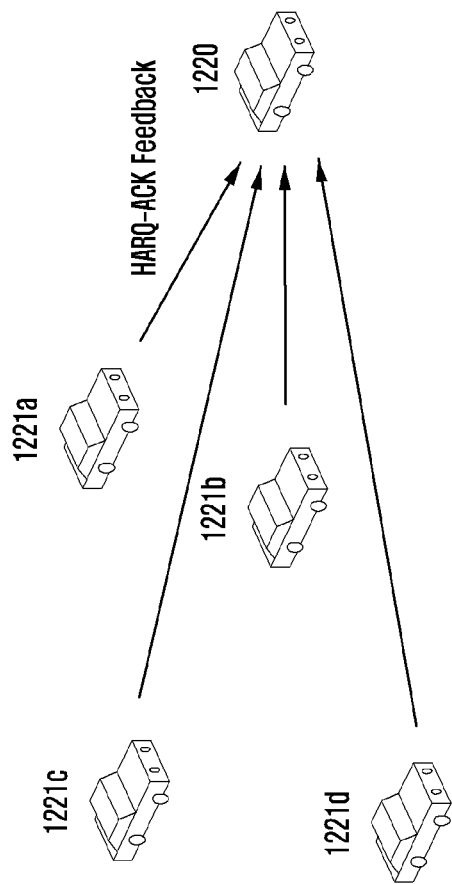
FIG. 12B illustrates an example of hybrid automatic repeat request (HARQ) feedback transmission based on groupcasting in a wireless communication system according to various embodiments of the disclosure.

FIG. 12B illustrates an example of HARQ feedback transmission based on groupcasting in a wireless communication system according to various embodiments of the disclosure.

With reference to FIG. 12B, the UEs 1221a, 1221b, 1221c, and 1221d, which have received common data by groupcasting, transmit information indicating success or failure of data reception to the UE 1220 that has transmitted the data. This information may include HARQ-ACK feedback. The data transmission and feedback operations as shown in FIGS. 12A and 12B are performed based on groupcasting. However, according to another embodiment, the data transmission and feedback operations as shown in FIGS. 12A and 12B may also be applied to unicast transmission.

Figure 13:
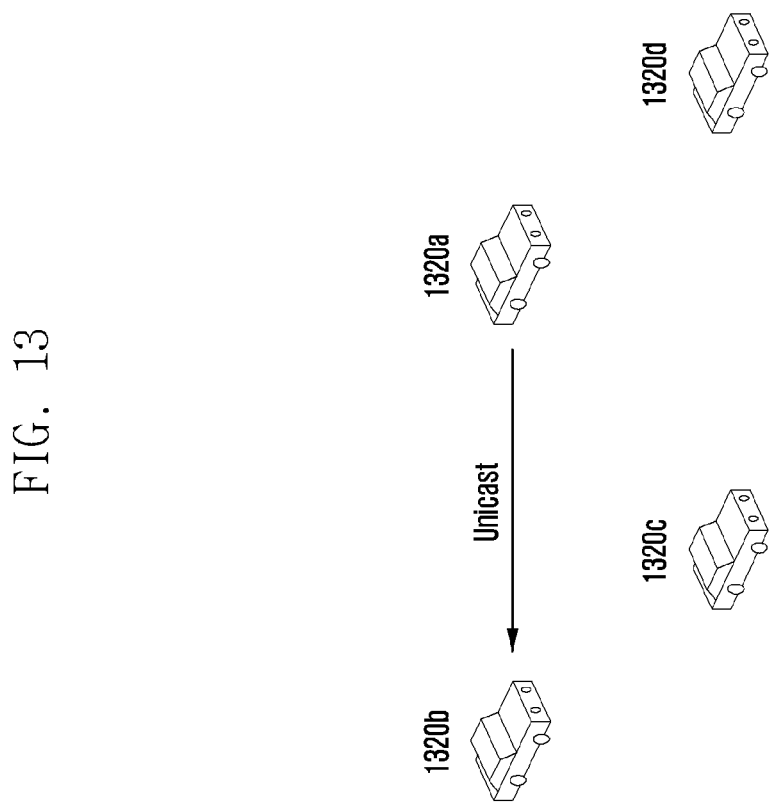
FIG. 13 illustrates an example of unicasting transmission in a wireless communication system according to various embodiments of the disclosure.

FIG. 13 illustrates an example of unicasting transmission in a wireless communication system according to various embodiments of the disclosure.

With reference to FIG. 13, a first UE 1320a transmits data to a second UE 1320b. In another example, the data transmission direction may be reversed (e.g., from the second UE 1320b to the first UE 1320a). Except the first and second UEs 1320a and 1320b, the other UEs 1320c and 1320d cannot receive data transmitted/received in a unicast manner between the first UE 1320a and the second UE 1320b. Transmission and reception of data through unicast between the first and second UEs 1320a and 1320b may be mapped in a resource promised between the first and second UEs 1320a and 1320b, scrambled using a mutually agreed value, or performed using a preconfigured value. In addition, control information related to data through unicast between the first and second UEs 1320a and 1320b may be mapped in a mutually agreed manner. Also, data transmission/reception through unicast between the first and second UEs 1320a and 1320b may include an operation of mutually identifying each unique ID. The UEs may be moving devices such as vehicles. At least one of separate control information, a physical control channel, and data may be further transmitted for unicast.

Figure 14A:
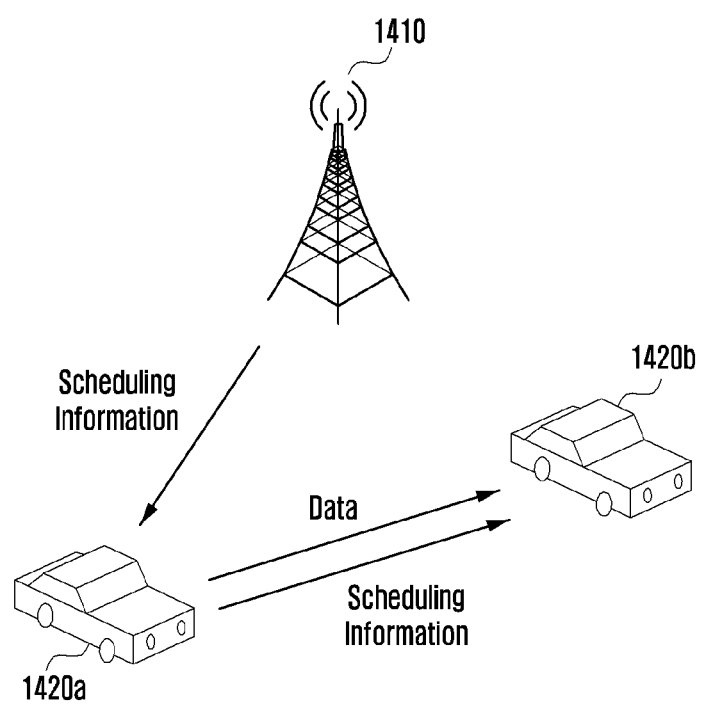
FIG. 14A illustrates an example of sidelink data transmission based on scheduling of a base station in a wireless communication system according to various embodiments of the disclosure.

FIG. 14A illustrates an example of sidelink data transmission based on scheduling of a base station in a wireless communication system according to various embodiments of the disclosure.

FIG. 14A exemplarily shows mode 1 in which a UE receiving scheduling information from a base station transmits sidelink data. Although in the disclosure a mode of performing sidelink communication based on scheduling information is referred to as mode 1, it may be referred to as another name. With reference to FIG. 14A, a UE 1420a (hereinafter referred to as a 'transmitting UE') that intends to transmit data in the sidelink receives scheduling information for sidelink communication from a base station 1410. The transmitting UE 1420a that has received the scheduling information transmits sidelink data to another UE 1420b (hereinafter referred to as a 'receiving UE'). The scheduling information for sidelink communication is included in DCI, and the DCI may include at least one of items shown in Table 19 below.

TABLE 19

| Item | Contents |
| --- | --- |
| Carrier indicator | It may be used for scheduling a sidelink of another carrier in a situation where carrier aggregation (CA) is applied. |
| Lowest index of sub-channel allocation for initial transmission | It may be used for frequency resource allocation of initial transmission. |
| Information to be included in sidelink control information | Frequency resource allocation information: It may include resource allocation or resource reservation information for initial transmission, retransmission, and subsequent N-th transmission. Time interval information between initial transmission and retransmission |
| Information about sidelink slot structure | It may include information about which slots and which symbols can be used for sidelink. |
| HARQ-ACK/CSI feedbacktiming information | It may include timing information for transmitting HARQ-ACK or CSI feedback in the sidelink to the base station. |
| Recipient ID | ID information about which UEs will receive |
| Quality-of-Service (QoS) information such as priority | Information about which priority data to transmit |

Scheduling may be performed for one-time sidelink transmission or may be performed for periodic transmission, semi-persistent scheduling (SPS), or configured grant transmission. The scheduling method may be distinguished by an indicator included in DCI or by an RNTI or ID value scrambled to CRC added to DCI. The DCI for sidelink transmission may further include a padding bit (e.g., 0 bit) to have the same size as other DCI formats such as DCI for downlink scheduling or uplink scheduling.

Upon receiving the DCI for sidelink scheduling from the base station 1410, the transmitting UE 1420a transmits PSCCH including the sidelink scheduling information and then transmits corresponding data PSSCH. The PSCCH, which is sidelink scheduling information, contains SCI, and the SCI may include at least one of items shown in Table 20 below.

TABLE 20

| Item | Contents |
| --- | --- |
| HARQ process number | HARQ process ID for HARQ related operation of transmitted data |
| New data indicator (NDI) | Information about whether currently transmitted data is new data |

TABLE 20-continued

| Item | Contents |
| --- | --- |
| Redundancy version | Information about which parity bit is transmitted when mapping by performing channel coding of data |
| Layer-1 source ID | ID information in a physical layer of a transmitting UE |
| Layer-1 destination ID | ID information in a physical layer of a receiving UE |
| Frequency-domain resource assignment for scheduling PSSCH | Frequency-domain resource configuration information of transmitted data |
| MCS | Modulation order and coding rate information |
| QoS indication | It may include a priority, a target latency/delay, a target distance, a target error rate, and the like. |
| Antenna port(s) | Antenna port information for data transmission |
| DMRS sequence initialization | It may include information such as an ID value for initialization of a DMRS sequence. |
| PTRS-DMRS association | It may include information about PTRS mapping. |
| CBGTI | It may be used as an indicator for CBG unit retransmission. |
| Resource reservation | Information for resource reservation |
| Time gap between initial transmission and retransmission | Information on a time interval between initial transmission and retransmission |
| Retransmission index | An indicator for distinguishing retransmission |
| Transmission format/cast type indicator | An indicator for distinguishing a transmission format or unicast/groupcast/broadcast |
| Zone ID | Location information of a transmitting UE |
| NACK distance | A reference indicator for determining whether a receiving UE should transmit HARQ-ACK/NACK |
| HARQ feedback indication | It may include information on whether HARQ feedback should be transmitted or whether it is being transmitted. |
| Time-domain resource assignment for scheduling PSSCH | Time-domain resource information of transmitted sidelink data |
| Second SCI indication | An indicator including mapping information of the second SCI in case of two-stage control information |
| DMRS pattern | DMRS pattern (e.g., symbol position to which DMRS is mapped) information |

The control information including at least one of the items shown in Table 20 may be contained in one SCI or two SCIs in order to be delivered to the receiving UE. The transmission of control information divided into two SCIs may be referred to as a two-stage SCI method.

Figure 14B:
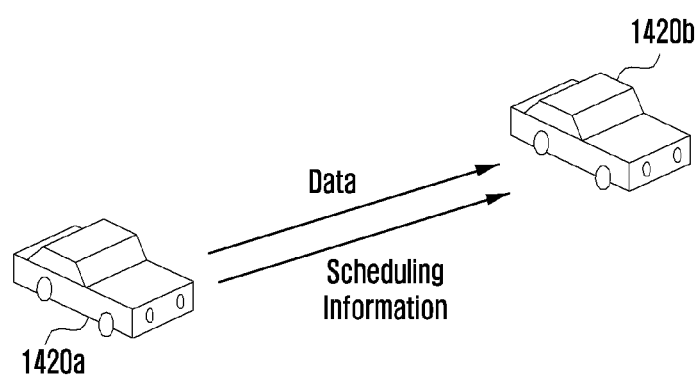
FIG. 14B illustrates an example of sidelink data transmission without scheduling of a base station in a wireless communication system according to various embodiments of the disclosure.

FIG. 14B illustrates an example of sidelink data transmission without scheduling of a base station in a wireless communication system according to various embodiments of the disclosure. FIG. 14B exemplarily shows a mode 2 in which a UE transmits sidelink data without receiving scheduling information from a base station. Although in the disclosure a mode of performing sidelink communication without scheduling information is referred to as mode 2, it may be referred to as another name. A UE 1420a desiring to transmit data in the sidelink may transmit sidelink scheduling control information and sidelink data to a receiving UE 1420b at its own discretion without scheduling from the base station. In this case, the SCI of the same format as the SCI used in mode 1 sidelink communication may be used for the sidelink scheduling control information. For example, the scheduling control information may include at least one of the items shown in Table 3.

Figure 15:
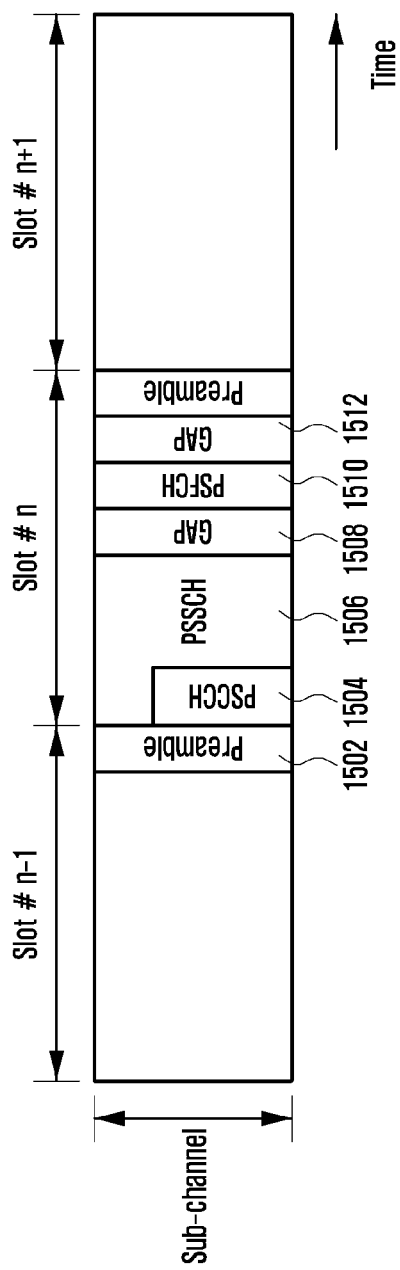
FIG. 15 illustrates an example of a channel structure of a slot used for sidelink communication in a wireless communication system according to various embodiments of the disclosure.

FIG. 15 illustrates an example of a channel structure of a slot used for sidelink communication in a wireless communication system according to various embodiments of the disclosure.

With reference to FIG. 15, a preamble 1502 is mapped before the start of the slot (slot #n), that is, to the end of the previous slot (slot #n−1). After that, from the start of the slot, a PSCCH 1504, a PSSCH 1506, a gap 1508, a physical sidelink feedback channel (PSFCH) 1510, and a gap 1512 are mapped.

Before transmitting a signal in the corresponding slot, the transmitting UE transmits a signal with the preamble 1502 in one or more symbols. The preamble may be used so that the receiving UE can correctly perform automatic gain control (AGC) for adjusting the strength of amplification when amplifying the power of a received signal. In addition, the preamble may or may not be transmitted depending on whether the transmitting UE transmits the previous slot. That is, when the transmitting UE transmits a signal to the same receiving UE in the previous slot (e.g., slot #n−1) of the corresponding slot (e.g., slot #n), the transmission of the preamble 1502 may be omitted. The preamble 1502 may be referred to as a 'synchronization signal', a 'sidelink synchronization signal', a 'sidelink reference signal', a 'midamble', an 'initial signal', a 'wake-up signal', or any other term having an equivalent technical meaning.

The PSCCH 1504 including control information may be transmitted using symbols transmitted at the beginning of the slot, and the PSSCH 1506 scheduled by the control information of the PSCCH 1504 may be transmitted. The PSSCH 1506 may be mapped to at least a part of SCI which is control information. Thereafter, the GAP 1508 exists, and the PSFCH 1510 that is a physical channel for transmitting feedback information is mapped.

The UE may be pre-configured with the position of a slot capable of transmitting the PSFCH. Such pre-configuration may be predetermined in the process of producing the UE, received when accessing a sidelink-related system, received from the base station when accessing the base station, or received from another UE.

In FIG. 15, the PSFCH 1510 is exemplarily shown as being located in the last part of the slot. By securing the gap 1508, which is an empty interval of a certain time, between the PSSCH 1506 and the PSFCH 1510, the UE that has transmitted or received the PSSCH 1506 can prepare (e.g., conversion between transmission and reception) reception or transmission of the PSFCH 1510. After the PSFCH 1510, there exists the gap 1512 that is an empty interval of a certain time.

PSSCH 1622*a* of slot #n, the PSSCH 1622*b* of slot #n+1, the PSSCH 1622*c* of slot #n+2, and the PSSCH 1622*d* of slot #n+3 is transmitted on the PSFCH 1624 in slot #+4. Here, the slot index may be indexes for slots included in a resource pool. That is, the four slots are not physically consecutive slots, but may be consecutively arranged slots among slots included in the resource pool (or slot pool) used for sidelink communication between UEs. The reason that the HARQ-ACK feedback information of the PSSCH transmitted in the fourth slot is not transmitted in the PSFCH of the same slot is because the processing time is not short enough for the UE to finish decoding the PSSCH transmitted in the corresponding slot and transmit the PSFCH in the same slot.

When transmitting and receiving the PSFCH, the UE needs to know the number of HARQ-ACK feedback bits included in the PSFCH to perform transmission and reception correctly. The number of HARQ-ACK feedback bits included in the PSFCH and which PSSCH to include HARQ-ACK bits may be determined based on one or a combination of items shown in Table 21 below.

TABLE 21

| Item |
| --- |
| Period of a slot capable of transmitting/receiving PSFCH according to a parameter such as periodicity PSFCH resource |
| Whether or not HARQ-ACK is bundling. It may be a value determined through AND operation on the HARQ-ACK bits of the PSFCH transmitted in a predetermined number of slots before transmission and reception of the PSFCH (that is, if at least one is NACK, it is judged as NACK). |
| The number of transport blocks (TBs) included in PSSCH |
| Whether code block group (CBG) unit retransmission is used and configured |
| Whether HARQ-ACK feedback is activated |
| The number of actually transmitted and received PSSCHs |
| Minimum processing time (K) of the UE for PSSCH processing and PSFCH transmission preparation |

Figure 16A:
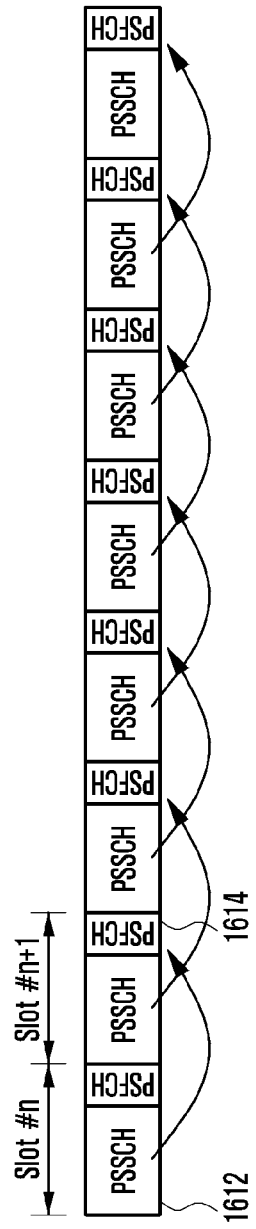
FIG. 16A illustrates a first example of a distribution of a feedback channel in a wireless communication system according to various embodiments of the disclosure.

FIG. 16A illustrates a first example of a distribution of a feedback channel in a wireless communication system according to various embodiments of the disclosure.

FIG. 16A exemplarily shows a case where a resource capable of transmitting and receiving a PSFCH is allocated in every slot. In FIG. 16A, an arrow indicates a slot of the PSFCH in which HARQ-ACK feedback information corresponding to a PSSCH is transmitted. With reference to FIG. 16A, the HARQ-ACK feedback information for the PSSCH 1612 transmitted in the slot #n is transmitted in the PSFCH 1614 in the slot #n+1. Because the PSFCH is allocated to every slot, the PSFCH may correspond to a slot including the PSSCH one-to-one. For example, if the period of a resource capable of transmitting/receiving the PSFCH is configured by a parameter such as 'periodicity_PSFCH_resource', in FIG. 16A, periodicity_PSFCH_resource indicates 1 slot. Alternatively, the period may be configured in msec units, and the period may be indicated by a value allocated to every slot depending on the subcarrier spacing.

Figure 16B:
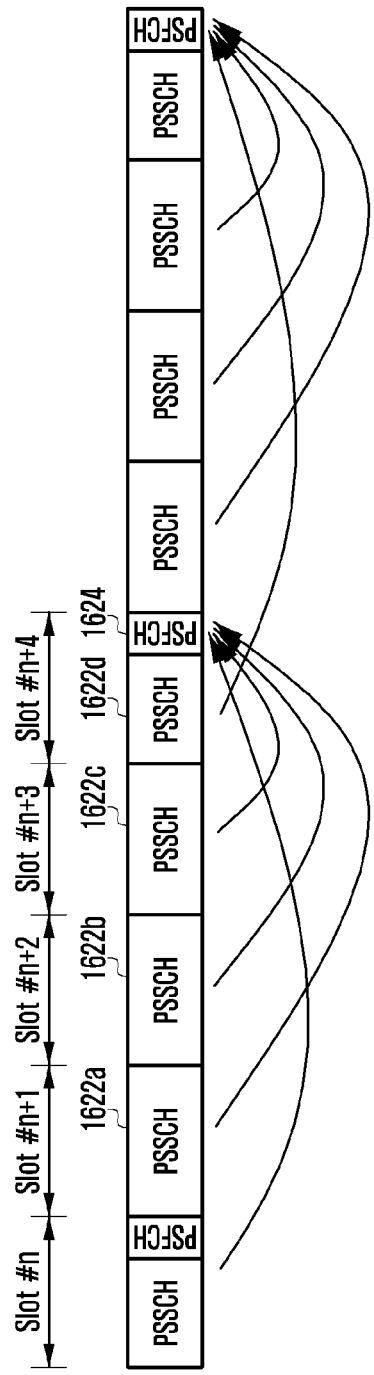
FIG. 16B illustrates a second example of a distribution of a feedback channel in a wireless communication system according to various embodiments of the disclosure.

FIG. 16B illustrates a second example of a distribution of a feedback channel in a wireless communication system according to various embodiments of the disclosure.

FIG. 16B exemplarily shows a case where a resource to transmit/receive the PSFCH is allocated in every 4 slots. In FIG. 16B, an arrow indicates a slot of the PSFCH in which HARQ-ACK feedback information corresponding to the PSSCH is transmitted. With reference to FIG. 16B, only the last slot among the four slots includes the PSFCH. Similarly, only the last of the next four slots contains the PSFCH. Therefore, the HARQ-ACK feedback information for the When the UE receives the PSSCH in slot #n and a resource for transmitting the PSFCH is configured or given in slot #n+x, the UE transmits the HARQ-ACK feedback information for the received PSSCH via the PSFCH of the slot #n+x by using the smallest x among integers greater than or equal to K. Here, K may be a value pre-configured from the transmitting UE or a value configured in a resource pool through which the corresponding PSSCH or PSFCH is transmitted. For configuration of K, each UE may exchange its capability information with the transmitting UE in advance. For example, K may be determined according to at least one of a subcarrier spacing, a UE capability, a configuration value with a transmitting UE, or a resource pool configuration.

As a Mode2 operation in the NR sidelink system, the transmitting UE may support a method of selecting a resource after sensing without pre-reserving a resource for initial transmission of one TB.

Meanwhile, as a method of reserving a resource for initial transmission, a method of reserving a resource using SCI for another TB may be supported, and this function may be enabled/disabled by (pre-) configuration (That is, SCII for controlling transmission of TB1 may reserve a resource for initial transmission of TB2). For example, in case that the above function is enabled, reservation interval information is configured in SCII when the previous TB (TB1) is transmitted, and the same frequency resource as the resource selected for transmitting the previous TB (TB1) may be reserved for the initial transmission of TB2 after a time interval configured as the reservation interval.

As another method of reserving the initial transmission resource, in addition to the above-mentioned method of using SCI for controlling another TB, a method of reserving the initial transmission resource for a corresponding TB by using SCI through standalone PSCCH transmission may be considered. Specifically, the standalone PSCCH transmission is a method of reserving a resource for the initial transmission by transmitting only the PSCCH. In order to support this method, a resource selection process for transmitting the standalone PSCCH may be additionally required separately from resource selection for the PSSCH. The method of reserving the initial transmission resource through the standalone PSCCH has an advantage of preventing a collision with the initial transmission resource, but it also has a disadvantage of incapable of receiving other sidelink resources by performing the transmission of the standalone PSCCH due to half duplex.

Also, when performing the initial transmission, a retransmission resource for one and the same TB may be reserved using SCI at the time of initial transmission. In this case, the SCI may be transmitted by including information on a time gap between initial transmission and retransmission for the same TB and frequency resource allocation information. Here, two cases may be considered: a case in which the same frequency allocation sizes for initial transmission and retransmission resources for the same TB are supported to be always equal, and a case in which frequency allocation sizes for initial transmission and retransmission resources are allowed to be different. In general, the latter case of allowing different frequency allocation sizes for initial transmission and retransmission resources has an advantage of more flexible resource selection. However, a method of instructing a reservation of a retransmission resource through SCI may become very complicated, and the number of bits transmitted through the SCI may increase, so that the performance of the SCI may decrease (e.g., the SCI coverage may decrease or the reception error rate may increase). Contrary to this, in the former case of always supporting the same frequency allocation sizes for initial transmission and retransmission resources, the flexibility of resource allocation is small, but a method of instructing a reservation of a retransmission resource through SCI may be simplified, and there is an advantage in that the performance of the SCI may be guaranteed by reducing the number of bits transmitted via the SCI. Therefore, the above-described two methods each have advantages and disadvantages.

As a method to complement the advantages and disadvantages of the above two methods (that is, a method of allowing different frequency allocation sizes for initial transmission and retransmission resources while supporting a method of indicating a reservation of a retransmission resource through SCI for one and the same TB during initial transmission as simply as possible), a method of fixedly transmitting initial transmission resources in X sub-channels and transmitting retransmission resources through one or more sub-channels may be considered. In this method, because the frequency allocation size of the initial transmission resource is always fixed, only the frequency allocation size for the retransmission resource needs to be indicated through the SCI. If there is more than one retransmission resource reserved for the same TB, the frequency allocation size of all retransmission resources may be equally limited. In addition, a method of limiting the number of sub-channels X for the initial transmission resource to one sub-channel may be considered. The value of X may be, for example, one, but the disclosure does not limit the value of X to one. When the initial transmission resource is transmitted with a fixed sub-channel value X, the PSCCH and the PSSCH are transmitted on X sub-channels. At this time, the SCI transmitted on the PSCCH may reserve the retransmission resource, and the size of the sub-channel for the retransmission resource may be allocated as Y sub-channels.

In case that, in the NR sidelink system, both the method of always supporting the same frequency allocation size for initial transmission and retransmission resources for the same TB and the method of fixedly transmitting initial transmission resources in X sub-channels and transmitting retransmission resources through one or more sub-channels are considered, the SCI may indicate as 1-bit information which method is used. This is to enable interpretation of resource reservation information included in the SCI. The disclosure specifically proposes the resource reservation information included in the SCI when the above two methods are considered. The following is an example of a method of indicating reservation information for initial transmission and one retransmission resource for a corresponding TB.

Figure 17A:
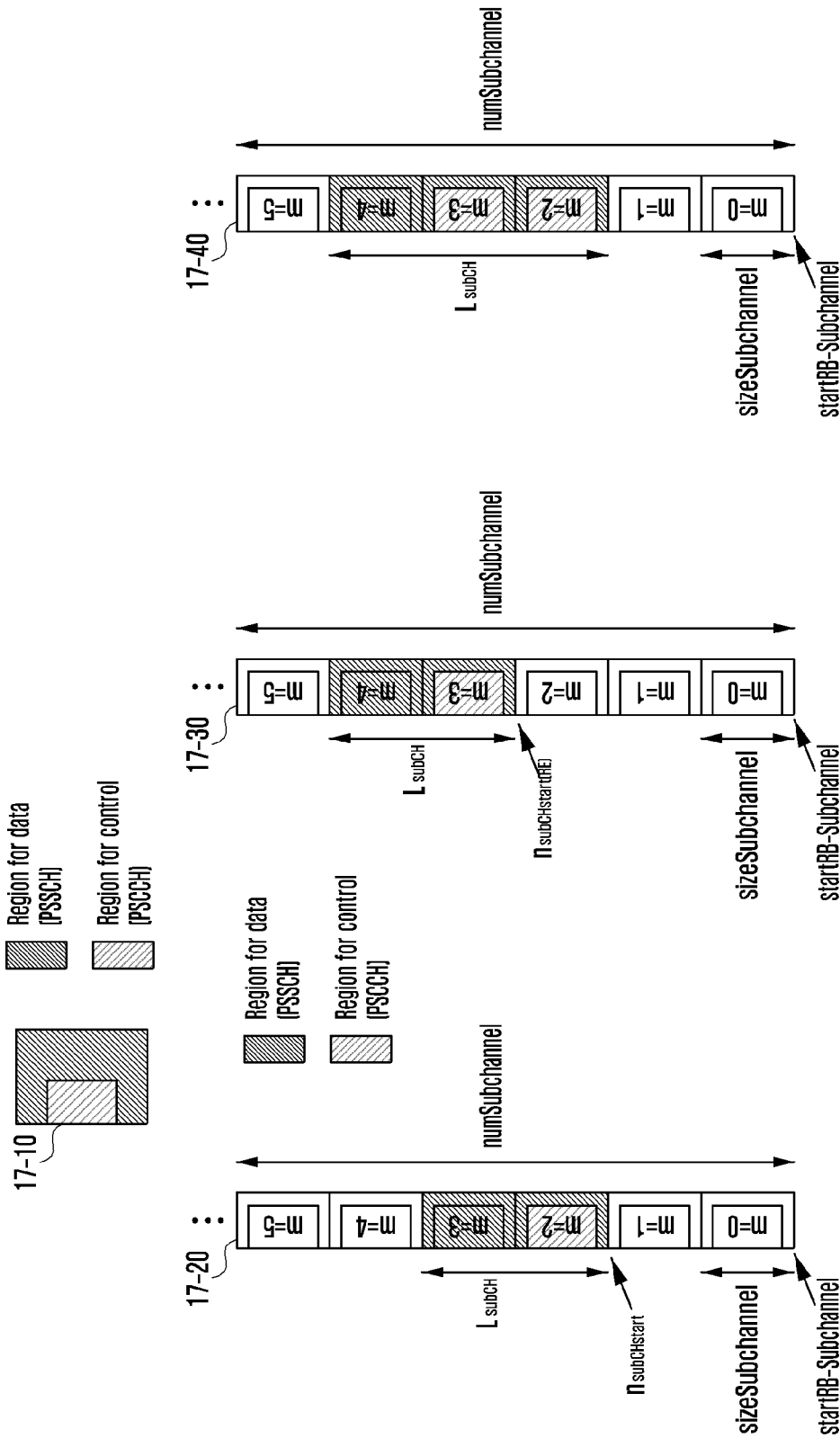
FIGS. 17A and 17B illustrate an example of a method for performing resource allocation of a PSSCH in units of sub-channels according to an embodiment of the disclosure.
Figure 17B:
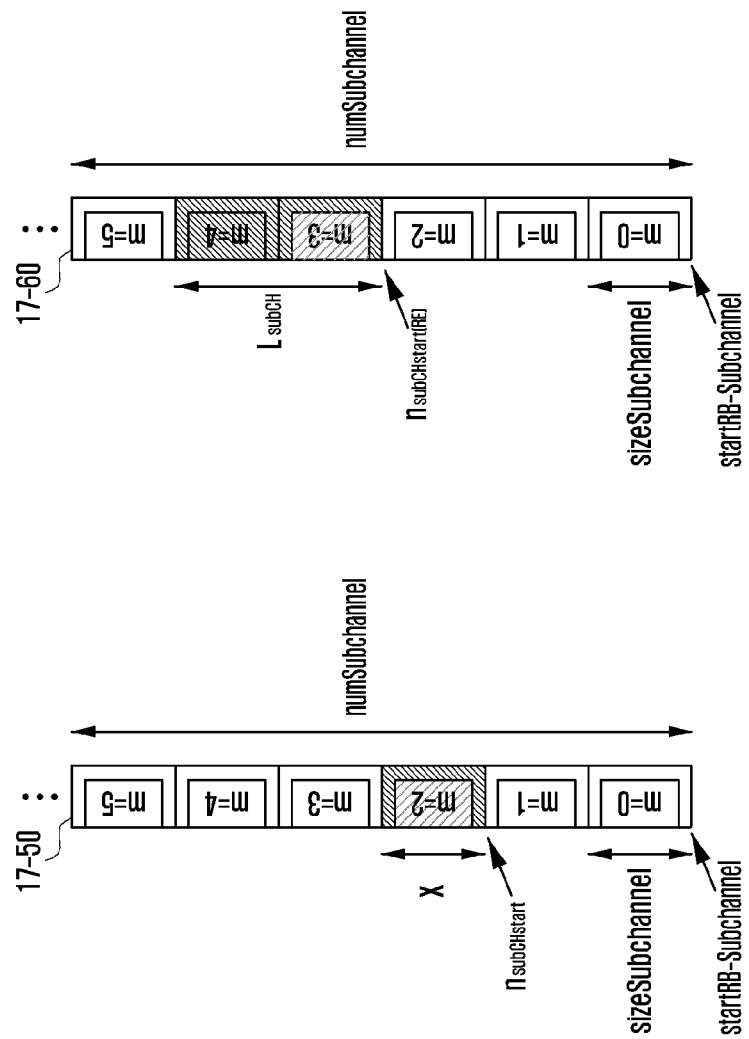

FIGS. 17A and 17B illustrate an example of a method for performing resource allocation of a PSSCH in units of sub-channels according to an embodiment of the disclosure. First, 17-10 shows a method of multiplexing the PSCCH and the PSSCH. With reference to FIGS. 17A and 17B, the PSCCH is transmitted in a sub-channel corresponding to the lowest sub-channel index in sub-channels allocated to the PSSCH. A method that the PSCCH is always included in a sub-channel and transmitted in the NR sidelink may be considered. In this case, a method of transmitting the PSCCH in a sub-channel may be determined depending on the size of a configured sub-channel. In addition, a method 17-40 of repeatedly transmitting the PSCCH in a PSSCH region depending on the size of a sub-channel may be considered. Specifically, 17-20 and 17-30 of FIG. 17A show methods of including and transmitting the PSCCH in a sub-channel by using the above-mentioned first method. Also, 17-50 and 17-60 of FIG. 17B show methods of including and transmitting the PSCCH in a sub-channel by using the above-mentioned second method.

With reference to FIGS. 17A and 17B, the UE may be configured with startRB-Sub-channel, sizeSub-channel, and numSub-channel as frequency configuration information for a resource pool. First, an example of indicating resource reservation information through SCI in case of using the method in which the frequency allocation sizes for initial transmission and retransmission resources for the same TB are supported to be always equal will be described. Specifically, the following method is a chain reservation method for indicating resource allocation for the current transmission and the next retransmission, and resource reservation information for the PSSCH indicated by the SCI in the slot tn allocated to the one pool may be determined as follows:

If the time gap ($SF_{gap}$) between the current transmission and the next retransmission is 0 (when retransmission is not performed), the time and frequency allocation positions for the PSSCH are as follows (17-20)

sub-channel(s) $n_{subCHstart}$, $N_{subCHstart}+1$, ... $n_{subCHstart}+L_{subCH}-1$ in slot $t_n$ If the time gap ($SF_{gap}$) between the current transmission and the next retransmission is not 0 (corresponding to the current transmission), the time and frequency allocation positions for the PSSCH are as follows sub-channel(s) $n_{subCHstart}$, $n_{subCHstart}+1$, ... $n_{subCHstart}+L_{subCH}-1$ in slot tn (17-20)

sub-channel(s) $n_{subCHstart(RE)}$, $n_{subCHstart(RE)}+1$, ... $n_{subCHstart(RE)}+L_{subCH}-1$ in slot $t_{n+SFgap}$ (17-30)

If the time gap ($SF_{gap}$) between the current transmission and the next retransmission is not 0 (corresponding to the next retransmission), the time and frequency allocation positions for the PSSCH are as follows sub-channel(s) $n_{subCHstart}$, $n_{subCHstart}+1$, ... $n_{subCHstart}+L_{subCH}-1$ in slot $t_{n-SFgap}$ sub-channel(s) $n_{subCHstart(RE)}$, $n_{subCHstart(RE)}+1$, ... $n_{subCHstart(RE)}+L_{subCH}-1$ in slot $t_n$ In the above, LsubCH indicates the length of a sub-channel allocated for the PSSCH, and nsubCHstart and nsubCHstart(RE) indicate the start position of a sub-channel allocated for the PSSCH in initial transmission and retransmission, and this information may be included in the SCI.

Contrary to this, the method of fixedly transmitting initial transmission resources in X sub-channels and transmitting retransmission resources through one or more sub-channels will be described. Specifically, the following method is a chain reservation method for indicating resource allocation for the current transmission and the next retransmission, and resource reservation information for the PSSCH indicated by the SCI in the slot $t_n$ allocated to the one pool may be determined as follows:

If the time gap ($SF_{gap}$) between the current transmission and the next retransmission is 0 (when retransmission is not performed), the time and frequency allocation positions for the PSSCH are as follows (17-50)

sub-channel(s) $n_{subCHstart}$, $n_{subCHstart}+1$, ... $n_{subCHstart}+X-1$ in slot $t_n$ If the time gap (SF gap) between the current transmission and the next retransmission is not 0 (corresponding to the current transmission), the time and frequency allocation positions for the PSSCH are as follows sub-channel(s) $n_{subCHstart}$, $n_{subCHstart}+1$, ... $n_{subCHstart}+X-1$ in slot $t_n$ (17-50)

sub-channel(s) $n_{subCHstart(RE)}$, $n_{subCHstart(RE)}+1$, ... $n_{subCHstart(RE)}+L_{subCH}-1$ in slot $t_{n+SFgap}$ (17-60)

If the time gap (SF gap) between the current transmission and the next retransmission is not 0 (corresponding to the next retransmission), the time and frequency allocation positions for the PSSCH are as follows sub-channel(s) $n_{subCHstart}$, $n_{subCHstart}+1$, ... $n_{subCHstart}+X-1$ in slot $t_{n-SFgap}$ sub-channel(s) $n_{subCHstart(RE)}$, $n_{subCHstart(RE)}+1$, ... $n_{subCHstart(RE)}+L_{subCH}-1$ in slot $t_n$ In the above, X indicates the length of a sub-channel allocated for the PSSCH in initial transmission, and LsubCH indicates the length of a sub-channel allocated for the PSSCH in retransmission. As described above, a method of fixing X to 1 may be considered, but the disclosure does not limit the value of X to 1. Also, nsubCHstart and nsubCHstart (RE) indicate the start positions of sub-channels allocated for the PSSCH in initial transmission and retransmission, and this information may be included in the SCI.

In case that the frequency resource allocation information is indicated through the above two methods, the start position nsubCHstart of a sub-channel allocated for the PSSCH in initial transmission may not be separately indicated by the SCI and may be replaced with the value of the PSCCH resource m (see FIGS. 17A and 17B). This may be supported when the PSCCH is capable of one-to-one connection in a region where the PSSCH is transmitted. When this method is used and only the start position nsubCHstart(RE) of a sub-channel allocated for the PSSCH in retransmission is indicated by the SCI, a resource indication value (RIV) may be defined as follows.

if $(L_{subCH} -1) \leq \lfloor N_{subCH}/2 \rfloor$ then
RIV = $N_{subCH} (L_{subCH} -1) + n_{subCH}^{start}$
else
RIV = $N_{subCH}(N_{subCH} - L_{subCH} +1) + (N_{subCH} -1- n_{subCH}^{start})$ Here, NsubCH denotes the total number of sub-channels configured in the resource pool.

Figure 18:
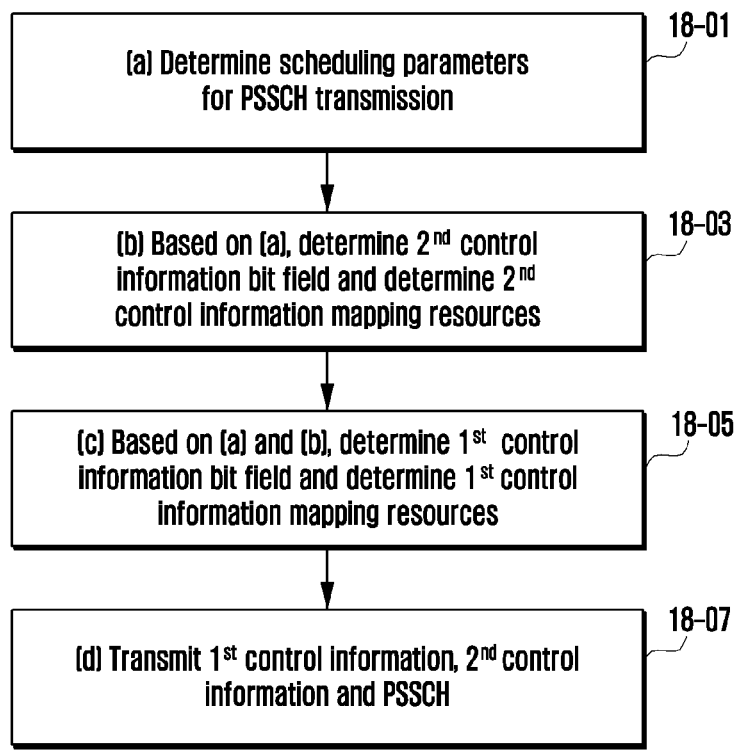
FIG. 18 is a flow diagram illustrating a method for a transmitting UE to determine values of bit fields of the first control information and the second control information.

FIG. 18 is a flow diagram illustrating a method for a transmitting UE to determine values of bit fields of the first control information and the second control information. At step 18-01, the transmitting UE determines a resource to transmit a PSSCH through the above-described method such as channel occupancy, channel reservation, and the like. Based on this, the transmitting UE determines scheduling parameters to be included in SCI. The scheduling parameters may include frequency and time resources, MCS, RV, NDI, H17RQ process ID, etc. of the PSSCH. At step 18-03, based on the determined scheduling parameters, the transmitting UE determines values of a bit field of second control information and determines transmission resources for mapping of the second control information. Also, at step 18-05, the transmitting UE determines a bit field value of first control information, based on the scheduling parameters of the PSSCH, the bit field value of the second control information, and the second control information mapping transmission resources. This is because the first control information may include information for decoding the second control information. At step 18-07, based on the determined information, the transmitting UE transmits the first control information, the second control information, and the PSSCH.

Figure 19:
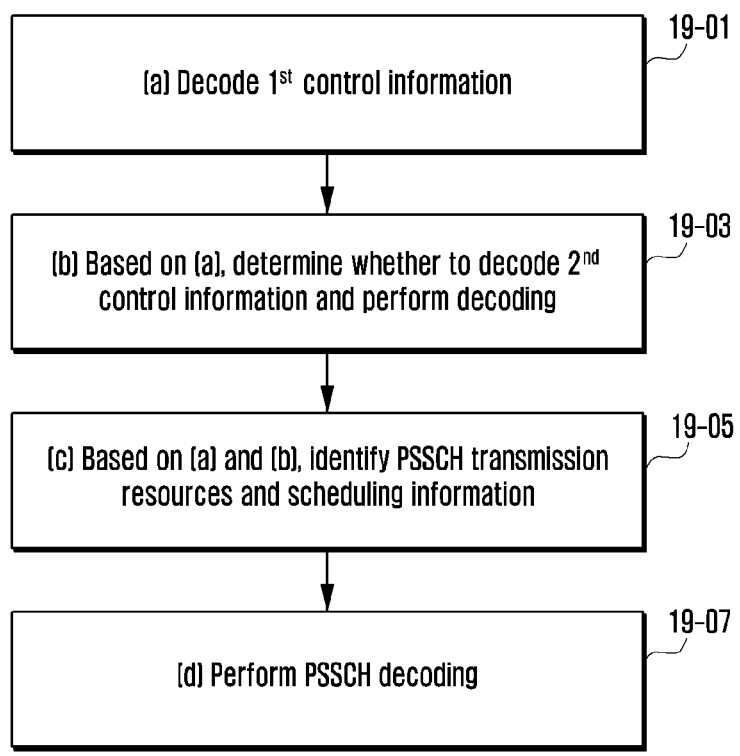
FIG. 19 is a flow diagram illustrating a method for a receiving UE to sequentially decode first control information and second control information and decoding PSSCH based thereon.

FIG. 19 is a flow diagram illustrating a method for a receiving UE to sequentially decode first control information and second control information and decoding PSSCH based thereon.

At step 19-01, the receiving terminal attempts to decode the first control information, based on preconfigured information. At step 19-03, the receiving UE determines whether to decode the second control information according to a bit field value of the first control information successfully decoded, if decoding of the second control information is required, determines which resource the second control information is mapped to, and performs decoding. Here, the reason for determining whether to decode the second control information is that, in any transmission type or transmission mode, decoding of the PSSCH may be possible only by decoding the first control information. Thereafter, at step 19-05, the receiving UE identifies PSSCH transmission resources and other scheduling information, based on the bit field values of the decoded first control information (SCI 1) and second control information (SCI 2). At step 19-07, the receiving UE performs PSSCH decoding by using the identified scheduling information and performs required subsequent operations.

The receiving UE may not necessarily have to decode the second control information only after successfully decoding the first control information as described above. Successful decoding of control information may mean that CRC checking is successful.

Figure 20:
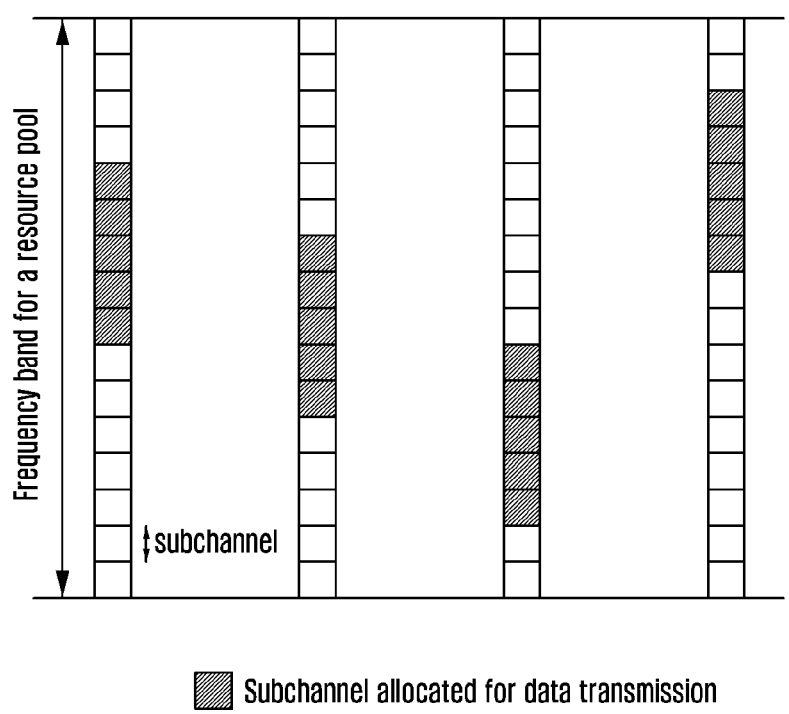
FIG. 20 is a diagram illustrating an example in which a frequency domain is divided in units of sub-channels in a given resource pool and resource allocation for data transmission is performed in units of sub-channels.

FIG. 20 is a diagram illustrating an example in which a frequency domain is divided in units of sub-channels in a given resource pool and resource allocation for data transmission is performed in units of sub-channels.

Assume that the number of sub-channels in the resource pool is Nsub-channel. One sub-channel may consist of one or more PRBs, which may be a value configured or preconfigured in the resource pool or a value calculated by a specific parameter. Here, data may be transmitted in a PSSCH, and resource allocation for data transmission may indicate a resource region used for PSSCH mapping.

If initial transmission is performed in slot n1 and retransmission for initial transmission is performed in slot n2, control information transmitted in the slot n1 may include resource allocation information for initial transmission and one retransmission. This may be time domain resource information for the slot n2, or frequency domain information for the slot n1 and the slot n2. If it is assumed that the number of sub-channels in the frequency domain used for initial transmission and retransmission is equal, when information on a first sub-channel on which PSSCH mapping starts in the corresponding slot is determined from a mapping position of the corresponding control information transmitted in the same slot, the control information transmitted in the initial transmission needs to include the number of sub-channels used for PSSCH mapping and information on the first sub-channel to which the PSSCH for retransmission is mapped. In this case, a bit field having the following size may be used in the control information to transmit frequency domain resource allocation information of the PSSCH in initial transmission and retransmission.

$$\left\lceil \log_2 \frac{N_{subchannel} \times (N_{subchannel} + 1)}{2} \right\rceil$$

The bit field of this size may indicate the number of PSSCH-mapped sub-channels and a start sub-channel position of the retransmission PSSCH, and $$\frac{N_{subchannel} \times (N_{subchonnel} + 1)}{2}$$

may indicate the number of cases for possible combinations between the number of PSSCH-mapped sub-channels and the start sub-channel position of the retransmission PSSCH. Using log with a base of 2 may be for calculating the number of bits to indicate possible cases of the number of cases. $\lceil x \rceil$ may indicate the smallest integer among integers greater than x, and this may be for indicating the size of a required bit field as an integer.

As shown in FIG. 20, in order to indicate frequency resource information to which the PSSCH is mapped for initial transmission and three retransmissions, the size of the bit field for frequency resource allocation may be calculated in the following method.

Method 1: In order to transmit frequency domain resource allocation information of PSSCH for initial transmission and three retransmissions, a bit field having the following size may be used for control information.

$$\left\lceil \log_2 \frac{(N_{subchannel})^3 \times (N_{subchannel} + 1)}{2} \right\rceil$$

For example, in FIG. 20, because the number of cases for the start sub-channel position of the PSSCH transmitted in the slot $n_3$ and the slot $n_4$ can be represented by $(N_{subchannel})^2$ the size of the bit field may be determined as in Method 1.

Method 2: In order to transmit frequency domain resource allocation information of PSSCH for initial transmission and three retransmissions, a bit field having the following size may be used for control information.

$$\left\lceil \log_2 \frac{N_{subchannel} \times (N_{subchannel} + 1)}{2} \right\rceil + 2 \times \lceil \log_2 N_{subchannel} \rceil$$

For example, in FIG. 20, because the start sub-channel position of the PSSCH transmitted in each of the slot n3 and the slot n4 can be possible as cases of $N_{subchannel}$, the size of the bit field may be determined as in Method 2. The Method 2 may be a method of transmitting information on the start sub-channel position of the PSSCH transmitted in the slot n3 and the slot n4 as independent bits.

Method 3: In order to transmit frequency domain resource allocation information of PSSCH for initial transmission and three retransmissions, a bit field having the following size may be used for control information.

$$\left\lceil \log_2 \frac{N_{subchannel} \times (N_{subchannel} + 1)}{2} \right\rceil + \lceil 2 \times \log_2 N_{subchannel} \rceil$$

For example, in FIG. 20, because the start sub-channel position of the PSSCH transmitted in each of the slot n3 and the slot n4 can be possible as cases of $N_{subchannel}$, the size of the bit field may be determined as in Method 3. The Method 3 may be a method of transmitting information on the start sub-channel position of the PSSCH transmitted in the slot n3 and the slot n4 as independent bits.

Hereinafter, the disclosure describes embodiments for performing a method of transmitting and receiving sidelink control information and data.

First Embodiment

The first embodiment provides a method and apparatus for a UE to transmit and receive control information in a sidelink.

The UE desiring to transmit data in the sidelink resource pool first performs a step of finding a resource in order to determine the resource of the sidelink to transmit data. This may be referred to as channel sensing, and the channel sensing may be to find in advance a resource for initial transmission and retransmission of specific data or transport block (TB). In the channel sensing process, resources found for initial transmission and retransmission may have different sizes in the frequency domain. For example, only one sub-channel or 10 PRBs may be used for initial transmission, and there may be a case where four sub-channels or 40 PRBs can be used in retransmission.

In this case, the TB transmitted in initial transmission and the TB transmitted in retransmission may have the same size. Therefore, the UE may need a method of determining the size of a TB (TB size; TBS) for initial transmission and retransmission. A UE that transmits control information and data and a UE that receives them may determine the size of a transmitted/received TB by using one or a combination of the following methods. The following methods may be to determine nPRB in Equation of $N_{RE}=\min(156,N_{RE}')\cdot N_{PRB}$ required to calculate NRE in the above-described method for determining the TBS. Also, the following methods may use a value less than 156, for example, 144, instead of 156 in Equation of $N_{RE}=\min(156,N_{RE}')\cdot N_{PRB}$ The value used instead of 156 may be determined differently depending on a slot belonging to the resource pool, for example, depending on whether a PSFCH resource is included in the corresponding slot. For example, if the PSFCH resource is not included in the slot, 144 may be used instead of 156, and if the PSFCH resource is included in the slot, 120 may be used instead of 156. The following methods may be applied when the size of a frequency resource allocated for initial transmission is different from the size of a frequency resource allocated for retransmission. Alternatively, the following methods may be applied when the size of a frequency resource allocated for initial transmission is X sub-channel. Alternatively, the following methods may be applied when the size of a frequency resource allocated for initial transmission is X sub-channel and the size of a frequency resource allocated for retransmission is larger than the X sub-channel. The X may be, for example, one. In order to indicate the cases listed above, a 1-bit indicator may be contained in the first control information or the second control information, and whether the 1-bit indicator is contained may be included in configuration or pre-configuration corresponding to the resource pool and delivered to the UE for use.

Method 1-1: The nPRB used for the TBS calculation may be determined as the number of PRBs included in sub-channels allocated for retransmission in the sidelink.

Method 1-2: The nPRB used for the TBS calculation may be determined as the sum of the number of PRBs included in sub-channels allocated for retransmission in the sidelink and the number of PRBs included in X sub-channel allocated for initial transmission.

Method 1-3: The nPRB used for the TBS calculation may be the number of PRBs included in the number of sub-channels obtained from a resource indication value (RIV) interpreted from a resource allocation bit field included in the first control information used for scheduling upon data transmission in the sidelink.

In the above, the meaning of the number of PRBs obtained from the number of sub-channels may be that nPRB is determined as nsubchannel×nPRB_per_subchannel. Here, nsubchannel may be the number of sub-channels used for data allocation or PSSCH allocation or a value derived from RIV obtained from the first control information, and nPRB_per_subchannel is the number of PRBs included in one sub-channel and may be a value included in resource pool configuration or a value derived from resource pool configuration information.

Second Embodiment

The second embodiment provides a method and apparatus for a UE to transmit data by determining a redundancy version (RV) value of the data.

The UE desiring to transmit data in the sidelink resource pool first performs a step of finding a resource in order to determine the resource of the sidelink to transmit data. This may be referred to as channel sensing, and the channel sensing may be to find in advance a resource for initial transmission and retransmission of specific data or transport block (TB). In the channel sensing process, resources found for initial transmission and retransmission may have different sizes in the frequency domain. For example, only one sub-channel or 10 PRBs may be used for initial transmission, and there may be a case where four sub-channels or 40 PRBs can be used in retransmission.

The following methods may be applied when the size of a frequency resource allocated for initial transmission is different from the size of a frequency resource allocated for retransmission. Alternatively, the following methods may be applied when the size of a frequency resource allocated for initial transmission is X sub-channel. Alternatively, the following methods may be applied when the size of a frequency resource allocated for initial transmission is X sub-channel and the size of a frequency resource allocated for retransmission is larger than the X sub-channel. The X may be, for example, one. In order to indicate the cases listed above, a 1-bit indicator may be contained in the first control information or the second control information, and whether the 1-bit indicator is contained may be included in configuration or pre-configuration corresponding to the resource pool and delivered to the UE for use.

Method 2-1: In the above case, the UE may transmit the PSSCH by applying an RV value of 0 in initial transmission and first retransmission of the corresponding TB. This may enable the UE receiving the first retransmission to correctly perform decoding.

Method 2-2: In the above case, the UE may transmit the PSSCH by using an RV value of 0 in initial transmission of the corresponding TB and apply repeatedly 0, 2, 3, and 1 in the order of transmission from first retransmission. This may enable the UE receiving the first retransmission to correctly perform decoding.

Third Embodiment

The third embodiment provides a method and apparatus for a UE to determine the maximum number of retransmissions.

The UE desiring to transmit data in the sidelink resource pool first performs a step of finding a resource in order to determine the resource of the sidelink to transmit data. This may be referred to as channel sensing, and the channel sensing may be to find in advance a resource for initial transmission and retransmission of specific data or transport block (TB). In the channel sensing process, resources found for initial transmission and retransmission may have different sizes in the frequency domain. For example, only one sub-channel or 10 PRBs may be used for initial transmission, and there may be a case where four sub-channels or 40 PRBs can be used in retransmission.

The following methods may be applied when the size of a frequency resource allocated for initial transmission is different from the size of a frequency resource allocated for retransmission. Alternatively, the following methods may be applied when the size of a frequency resource allocated for initial transmission is X sub-channel. Alternatively, the following methods may be applied when the size of a frequency resource allocated for initial transmission is X sub-channel and the size of a frequency resource allocated for retransmission is larger than the X sub-channel. The X may be, for example, one. In order to indicate the cases listed above, a 1-bit indicator may be contained in the first control information or the second control information, and whether the 1-bit indicator is contained may be included in configuration or pre-configuration corresponding to the resource pool and delivered to the UE for use.

When the UE transmits a specific TB, there may be a limit to the number of transmissions or retransmissions of the TB. For example, the UE may transmit a specific TB only up to N_max times, and the N_max value may be a fixed value or a value configured in a resource pool.

In the above-mentioned case, in case that the size of a frequency resource allocated for initial transmission is X sub-channel and the size of a frequency resource allocated for retransmission is larger than the X sub-channel, or in case that the 1-bit indicator of control information indicates that initial transmission and retransmission have different sub-channel allocation sizes, the initial transmission may be considered as being not included in the number of transmissions for determining the limit on the maximum number of transmissions of the corresponding TB.

That is, if the size of a frequency resource allocated for initial transmission is X sub-channel and the size of a frequency resource allocated for retransmission is larger than the X sub-channel, the UE may be permitted to perform N_max retransmissions except for initial transmission. If the size of a frequency resource allocated for initial transmission is equal to the size of a frequency resource allocated for retransmission, the UE may be permitted to perform N_max−1 retransmissions except for initial transmission.

Fourth Embodiment

The fourth embodiment provides a method and apparatus for a UE to perform data or PSSCH decoding.

The UE desiring to transmit data in the sidelink resource pool first performs a step of finding a resource in order to determine the resource of the sidelink to transmit data. This may be referred to as channel sensing, and the channel sensing may be to find in advance a resource for initial transmission and retransmission of specific data or transport block (TB). In the channel sensing process, resources found for initial transmission and retransmission may have different sizes in the frequency domain. For example, only one sub-channel or 10 PRBs may be used for initial transmission, and there may be a case where four sub-channels or 40 PRBs can be used in retransmission.

The following methods may be applied when the size of a frequency resource allocated for initial transmission is different from the size of a frequency resource allocated for retransmission. Alternatively, the following methods may be applied when the size of a frequency resource allocated for initial transmission is X sub-channel. Alternatively, the following methods may be applied when the size of a frequency resource allocated for initial transmission is X sub-channel and the size of a frequency resource allocated for retransmission is larger than the X sub-channel. The X may be, for example, one. In order to indicate the cases listed above, a 1-bit indicator may be contained in the first control information or the second control information, and whether the 1-bit indicator is contained may be included in configuration or pre-configuration corresponding to the resource pool and delivered to the UE for use.

Method 4-1: In the above-listed cases, for example, when the size of a frequency resource allocated for initial transmission is X sub-channel and the size of a frequency resource allocated for retransmission is larger than 1 sub-channel, the UE receiving control information and data may decode PSSCH data received in initial transmission sub-channel and data received in retransmission together without decoding the PSSCH received in the initial transmission X sub-channel. This may be because the probability of decoding failure on data received in the X sub-channel is high even if decoding is performed. In the above, the meaning of not performing decoding of the PSSCH received in the initial transmission X sub-channel may be what not performing decoding of channel coding. Even if not performing such decoding, the receiving UE can perform channel measurement and demodulation and store the performing result in a soft buffer.

Method 4-2: In the above-listed cases, for example, when the size of a frequency resource allocated for initial transmission is X sub-channel and the size of a frequency resource allocated for retransmission is larger than the X sub-channel, and also when the code rate of a TB transmitted via the PSSCH is greater than a specific value (e.g., when the code rate is greater than 1), the UE receiving control information and data may decode PSSCH data received in initial transmission sub-channel and data received in retransmission together without decoding the PSSCH received in the initial transmission X sub-channel. This may be because the probability of decoding failure on data received in the X sub-channel, especially when the code rate is greater than 1, is high even if decoding is performed. The meaning of not performing decoding of the PSSCH received in the initial transmission X sub-channel may be what not performing decoding of channel coding. Even if not performing such decoding, the receiving UE can perform channel measurement and demodulation and store the performing result in a soft buffer.

In the above method, when the receiving UE needs to transmit the HARQ-ACK of the TB without performing channel code decoding, the receiving UE may set the corresponding HARQ-ACK feedback information to NACK and transmit it. In this case, because the data transmitting UE may determine, when it needs to receive the corresponding feedback, that the data receiving UE has transmitted NACK, the transmitting UE may omit decoding of the HARQ-ACK feedback, that is, a receiving operation of the corresponding PSFSCH.

Fifth Embodiment

The fifth embodiment provides a method and apparatus for a UE to receive data or PSSCH and then transmit HARQ-ACK feedback of the corresponding data.

The UE desiring to transmit data in the sidelink resource pool first performs a step of finding a resource in order to determine the resource of the sidelink to transmit data. This may be referred to as channel sensing, and the channel sensing may be to find in advance a resource for initial transmission and retransmission of specific data or transport block (TB). In the channel sensing process, resources found for initial transmission and retransmission may have different sizes in the frequency domain. For example, only one sub-channel or 10 PRBs may be used for initial transmission, and there may be a case where four sub-channels or 40 PRBs can be used in retransmission.

The following methods may be applied when the size of a frequency resource allocated for initial transmission is different from the size of a frequency resource allocated for retransmission. Alternatively, the following methods may be applied when the size of a frequency resource allocated for initial transmission is X sub-channel. Alternatively, the following methods may be applied when the size of a frequency resource allocated for initial transmission is X sub-channel and the size of a frequency resource allocated for retransmission is larger than the X sub-channel. The X may be, for example, one. In order to indicate the cases listed above, a 1-bit indicator may be contained in the first control information or the second control information, and whether the 1-bit indicator is contained may be included in configuration or pre-configuration corresponding to the resource pool and delivered to the UE for use.

Method 5-1: In the above-listed cases, for example, when the size of a frequency resource allocated for initial transmission is X sub-channel and the size of a frequency resource allocated for retransmission is larger than the X sub-channel, the UE receiving control information and data may not transmit the HARQ-ACK feedback for the PSSCH received in the initial transmission X sub-channel. That is, transmission of the corresponding PSFCH may not be performed. This may mean that transmission of the PSFCH can be omitted even when the PSFCH needs to be transmitted according to the configuration of the corresponding resource pool. This may be to save the transmission power of the UE.

Method 5-2: In the above-listed cases, for example, when the size of a frequency resource allocated for initial transmission is X sub-channel and the size of a frequency resource allocated for retransmission is larger than the X sub-channel, and also when the code rate of a TB transmitted via the PSSCH is greater than a specific value (e.g., when the code rate is greater than 1), the UE receiving control information and data may not transmit the HARQ-ACK feedback for the PSSCH received in the initial transmission X sub-channel. That is, transmission of the corresponding PSFCH may not be performed. This may mean that transmission of the PSFCH can be omitted even when the PSFCH needs to be transmitted according to the configuration of the corresponding resource pool. This may be to save the transmission power of the UE.

Because the data transmitting UE may determine, when it needs to receive the corresponding feedback, that the data receiving UE has omitted transmission of the PSFCH for the PSSCH received in the initial transmission sub-channel or has transmitted NACK, the transmitting UE may omit decoding of the HARQ-ACK feedback, that is, a receiving operation of the corresponding PSFSCH.

Meanwhile, even if the PSFCH resource is configured in the resource pool, the receiving UE may not use the PSFCH when the HARQ enabling bit for indicating whether the receiving UE transmits HARQ-ACK feedback is indicated as off in the same SCI as the first control information or the second control information. Therefore, in the case of the above method, for example, when the size of a frequency resource allocated for initial transmission is X sub-channel and the size of a frequency resource allocated for retransmission is larger than the X sub-channel, the UE receiving control information and data may indicate by determining the HARQ enabling bit included in the corresponding control information as off when transmitting data via the X sub-channel. This may be in order for the receiving UE not to transmit HARQ-ACK feedback upon receiving data through the X sub-channel.

Sixth Embodiment

The sixth embodiment provides a method and apparatus for a UE to map the second control information to a PSSCH.

The UE desiring to transmit data in the sidelink resource pool first performs a step of finding a resource in order to determine the resource of the sidelink to transmit data. This may be referred to as channel sensing, and the channel sensing may be to find in advance a resource for initial transmission and retransmission of specific data or transport block (TB). In the channel sensing process, resources found for initial transmission and retransmission may have different sizes in the frequency domain. For example, only one sub-channel or 10 PRBs may be used for initial transmission, and there may be a case where four sub-channels or 40 PRBs can be used in retransmission.

The following methods may be applied when the size of a frequency resource allocated for initial transmission is different from the size of a frequency resource allocated for retransmission. Alternatively, the following methods may be applied when the size of a frequency resource allocated for initial transmission is X sub-channel. Alternatively, the following methods may be applied when the size of a frequency resource allocated for initial transmission is X sub-channel and the size of a frequency resource allocated for retransmission is larger than the X sub-channel. The X may be, for example, one. In order to indicate the cases listed above, a 1-bit indicator may be contained in the first control information or the second control information, and whether the 1-bit indicator is contained may be included in configuration or pre-configuration corresponding to the resource pool and delivered to the UE for use.

In the above case, when the UE initially transmits data, control information and data should be mapped to the X sub-channel. That is, the PSSCH and control information including the first control information and the second control information should be mapped to the X sub-channel, but corresponding frequency resources may be insufficient to map only the first control information and the second control information. In this case, even if the second control information is to be mapped according to a predetermined rule, it may not be possible to map the second control information according to the rule due to insufficient resources. As such, when mapping is impossible due to insufficient resources while mapping the second control information, the coded bits of the remaining second control information to be mapped may be omitted so as not to be transmitted in the initial transmission.

The methods according to claims or embodiments described in the disclosure may be implemented by hardware, software, or a combination of hardware and software.

In case of implementation using software, a computer-readable storage medium for storing one or more programs (software modules) may be provided as hardware. One or more programs stored in the computer-readable storage medium are configured for execution by one or more processors in an electronic device. The one or more programs include instructions that cause the electronic device to perform the methods according to claims or embodiments described herein.

Such programs (software module, software) may be stored in a random access memory, a non-volatile memory including a flash memory, a read only memory (ROM), an electrically erasable programmable ROM (EEPROM), a magnetic disc storage device, a compact disc ROM, digital versatile discs (DVDs) or other optical storage devices, and a magnetic cassette. Alternatively, the programs may be stored in a memory combining part or all of the above recording media. A plurality of memories may be equipped.

In addition, the programs may be stored in an attachable storage device accessible via a communication network formed of Internet, Intranet, local area network (LAN), wide area network (WAN), or storage area network (SAN) alone or in combination. This storage device may access an apparatus performing embodiments of the disclosure through an external port. In addition, a separate storage device in the communication network may access an apparatus performing embodiments of the disclosure.

In the above-described embodiments, components or elements have been expressed as a singular or plural form. It should be understood, however, that such singular or plural representations are selected appropriately according to situations presented for the convenience of description, and the disclosure is not limited to the singular or plural form. Even expressed in a singular form, a component or element may be construed as a plurality of components or elements, and vice versa.

While the disclosure has been particularly shown and described with reference to exemplary embodiments thereof, it will be understood by those skilled in the art that various changes in form and details may be made therein without departing from the scope of the subject matter as defined by the appended claims.

The invention claimed is:

1. A method of a first terminal in a wireless communication system, the method comprising:
    identifying a size of a frequency resource related to an initial transmission and a size of a frequency resource related to at least one retransmission based on sidelink control information, wherein the size of the frequency resource related to the initial transmission and the size of the frequency resource related to the at least one retransmission are different from each other;
    identifying a transport block size (TBS) based on a number of physical resource blocks (PRBs) included in the frequency resource related to the initial transmission and the frequency resource related to the at least one retransmission;
    transmitting, from a second terminal, sidelink control information for scheduling the initial transmission and the at least one retransmission; and
    transmitting, to the second terminal, a transport block repeatedly according to the TBS through the initial transmission and the at least one retransmission,
    wherein a redundancy version (RV) value related to the initial transmission and an RV value related to first retransmission among the at least one retransmission are same as 0.

2. The method of claim 1, further comprising:
    identifying a maximum number of transmissions related to the transport block,
    wherein for the at least one retransmission excluding the initial transmission, retransmissions are allowed as many as the maximum number of transmissions.

3. The method of claim 1, wherein for the transport block transmitted through the initial transmission, decoding by the second terminal is not performed, and
    wherein for a transport block combining the transport block transmitted through the initial transmission and the transport block transmitted through the first retransmission, decoding by the second terminal is performed.

4. The method of claim 1, wherein a hybrid automatic repeat request (HARQ) ACK signal corresponding to the transport block transmitted through the initial transmission is not transmitted by the second terminal.

5. A method of a second terminal in a wireless communication system, the method comprising:
    receiving, to a first terminal, sidelink control information for scheduling an initial transmission and at least one retransmission;
    identifying a size of a frequency resource related to the initial transmission and a size of a frequency resource related to the at least one retransmission, wherein the size of the frequency resource related to the initial transmission and the size of the frequency resource related to the at least one retransmission are different from each other; and
    receiving, from the first terminal, a transport block repeatedly according to a transport block size (TBS) through initial transmission and at least one retransmission,
    wherein the TBS is based on a number of physical resource blocks (PRBs) included in the frequency resource related to the initial transmission and the frequency resource related to the at least one retransmission, and
    wherein a redundancy version (RV) value related to the initial transmission and an RV value related to first retransmission among the at least one retransmission are same as 0.

6. The method of claim 5, further comprising:
    identifying a maximum number of transmissions related to the transport block,
    wherein for the at least one retransmission excluding the initial transmission, retransmissions are allowed as many as the maximum number of transmissions.

7. The method of claim 5, wherein for the transport block transmitted through the initial transmission, decoding is not performed, and
    wherein for a transport block combining the transport block transmitted through the initial transmission and the transport block transmitted through the first retransmission, decoding by the second terminal is performed.

8. The method of claim 5, wherein a hybrid automatic repeat request (HARQ) ACK signal corresponding to the transport block transmitted through the initial transmission is not transmitted to the first terminal.

9. A first terminal in a wireless communication system, comprising:
    a transceiver; and
    a controller configured to:
        identify a size of a frequency resource related to an initial transmission and a size of a frequency resource related to at least one retransmission based on sidelink control information, wherein the size of the frequency resource related to the initial transmission and the size of the frequency resource related to the at least one retransmission are different from each other;
        identify a transport block size (TBS) based on a number of physical resource blocks (PRBs) included in the frequency resource related to the initial transmission and the frequency resource related to the at least one retransmission;
        transmit, from a second terminal, sidelink control information for scheduling the initial transmission and the at least one retransmission; and
        transmit, to the second terminal, a transport block repeatedly according to the TBS through the initial transmission or the at least one retransmission,
    wherein a redundancy version (RV) value related to the initial transmission and an RV value related to first retransmission among the at least one retransmission are same as 0.

10. The first terminal of claim 9, wherein the controller is further configured to identify a maximum number of transmissions related to the transport block, and
    wherein for the at least one retransmission excluding the initial transmission, retransmissions are allowed as many as the maximum number of transmissions.

11. The first terminal of claim 9, wherein for the transport block transmitted through the initial transmission, decoding by the second terminal is not performed, and wherein for a transport block combining the transport block transmitted through the initial transmission and the transport block transmitted through the first retransmission, decoding by the second terminal is performed.

12. A second terminal in a wireless communication system, comprising:
    a transceiver; and
    a controller configured to:
        receive, to a first terminal, sidelink control information for scheduling an initial transmission and at least one retransmission;
        identify a size of a frequency resource related to the initial transmission and a size of a frequency resource related to at least one retransmission, wherein the size of the frequency resource related to the initial transmission and the size of the frequency resource related to the at least one retransmission are different from each other;
        receive, from the first terminal, a transport block repeatedly according to a transport block size (TBS) through initial transmission and at least one retransmission,
    wherein the TBS is based on a number of physical resource blocks (PRBs) included in the frequency resource related to the initial transmission and the frequency resource related to the at least one retransmission, and
    wherein a redundancy version (RV) value related to the initial transmission and an RV value related to first retransmission among the at least one retransmission are same as 0.

* * * * *